(12) United States Patent
Higginbottom et al.

(10) Patent No.: US 6,952,484 B1
(45) Date of Patent: Oct. 4, 2005

(54) METHOD AND APPARATUS FOR MARK DETECTION

(75) Inventors: Paul Raymond Higginbottom, Castle Hill (AU); Julie Yan Zhu, Epping (AU); Yu-Ling Chen, Epping (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/441,294

(22) Filed: Nov. 16, 1999

(30) Foreign Application Priority Data

| Nov. 30, 1998 | (AU) | ............................................. PP7427 |
| Nov. 30, 1998 | (AU) | ............................................. PP7428 |
| Nov. 30, 1998 | (AU) | ............................................. PP7429 |
| Nov. 30, 1998 | (AU) | ............................................. PP7434 |

(51) Int. Cl.[7] ............................. G06K 9/00; G06K 9/68
(52) U.S. Cl. .................. 382/100; 382/218; 382/219; 382/222
(58) Field of Search ............................... 382/100, 218, 382/219, 222

(56) References Cited

U.S. PATENT DOCUMENTS

| 3,638,188 | A | * | 1/1972 | Pincoffs et al. ............. 382/225 |
| 5,621,810 | A | * | 4/1997 | Suzuki et al. ............... 382/135 |
| 5,848,189 | A | | 12/1998 | Pearson et al. .............. 382/218 |
| 6,002,800 | A | * | 12/1999 | Donelly et al. .............. 382/216 |
| 6,067,374 | A | * | 5/2000 | Fan et al. .................... 382/135 |
| 6,091,844 | A | | 7/2000 | Fujii et al. ................... 382/135 |
| 6,115,494 | A | | 9/2000 | Sonoda et al. ............... 382/165 |
| 6,188,787 | B1 | * | 2/2001 | Ohmae et al. ............... 382/165 |
| 6,272,245 | B1 | * | 8/2001 | Lin .............................. 382/195 |
| 6,351,550 | B1 | * | 2/2002 | Inaoka et al. ................ 382/135 |
| 6,404,901 | B1 | * | 6/2002 | Itokawa ....................... 382/103 |
| 2002/0114521 | A1 | | 8/2002 | Fujii et al. ................... 382/209 |
| 2003/0194136 | A1 | | 10/2003 | Fujii et al. ................... 382/209 |

FOREIGN PATENT DOCUMENTS

| DE | 32 34 608 | 3/1984 | ............ G06K/9/70 |
| EP | 0 649 114 | 4/1995 | ............ G06K/9/68 |
| EP | 0 744 705 A2 | 11/1996 | |
| EP | 0 751 475 | 1/1997 | ............ G06K/9/46 |
| WO | WO 97-36260 | 10/1997 | ............ G06T/7/00 |

\* cited by examiner

*Primary Examiner*—Leo Boudreau
*Assistant Examiner*—Hussein Akhavannik
(74) *Attorney, Agent, or Firm*—Fitzpatrick, Cella, Harper & Scinto

(57) ABSTRACT

Disclosed is a method of detecting a predetermined mark embedded in an image. The mark (29) comprises a predetermined arrangement of a plurality of elements (30), each element having a predetermined colour characteristic and predetermined shape. The method processes (20) the image to provide an encoded representation of the image at a predetermined resolution (eg. 200 dpi). The coordinate positions for substantially each of the elements of the mark embedded in the image are detected (22), wherein the detection is characterised by applying at least one mask (80) to substantially each pixel of the encoded representation. From the coordinate positions, a set of spatial features representing a spatial arrangement of the detected elements are then determined (23). The determined set of spatial features is then compared (24) to a known set of spatial features to provide a confidence level measure for a degree of matching between the known set and the determined set of spatial features.

45 Claims, 28 Drawing Sheets

| Fig. 22a |
| Fig. 22b |

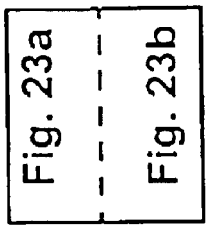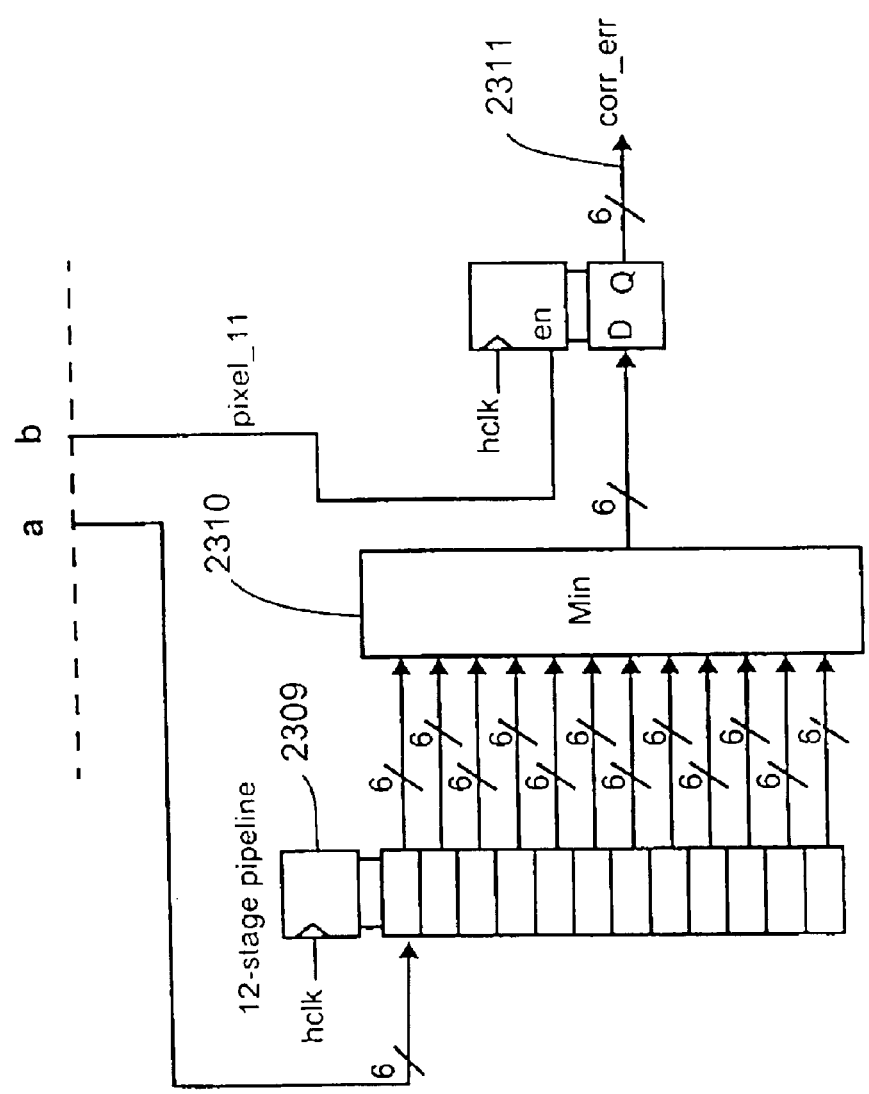

METHOD AND APPARATUS FOR MARK DETECTION

FIELD OF THE INVENTION

The present invention relates to image processing and in particular to a method and apparatus for the detection of predetermined marks or symbols embedded into an image.

BACKGROUND ART

The accurate detection of marks or other indicia in documents is important in the presentation of fraud and disreputable handling of such documents. Specifically, with the introduction of high quality colour photocopying, the simple copying of banknotes has presented an immediate need for arrangements to prevent such reproductions. Whilst watermarking and holography have been used in some currencies, with relative success, not all banknotes or other valuable instruments (eg. stock certificates, bonds etc) are similarly protected.

European Patent Publication No. EP 0744 705A2 discloses an image detection system that stores templates of image portions and compares those templates against regions of the image at various rotations.

SUMMARY OF THE INVENTION

In accordance with a first aspect of the present invention there is provided a method of detecting a predetermined mark embedded into an image, said mark comprising a predetermined arrangement of a plurality of elements, each element having a predetermined colour characteristic and predetermined shape, the method including the steps of:

processing the image to provide an encoded representation of the image at a predetermined resolution;

detecting coordinate positions for substantially each of said elements of the mark embedded into the image, wherein the detection is characterised by applying at least one mask to substantially each pixel of the encoded representation;

determining a set of spatial features representing a spatial arrangement of the detected elements; and comparing the determined set of spatial features to a known set of spatial features and providing a confidence level measure for a degree of matching between the known set and the determined set of spatial features.

In accordance with a second aspect of the present invention there is provided an apparatus for detecting a predetermined mark embedded into an image, said mark comprising a predetermined arrangement of a plurality of elements, each element having a predetermined colour characteristic and predetermined shape, the apparatus including:

processing means for processing the image to provide an encoded representation of the image at a predetermined resolution;

detecting means for determining coordinate positions of substantially each of said elements of the mark embedded into the image, wherein the detection is characterised by applying at least one mask to substantially each pixel of the encoded representation;

spatial feature determining means for determining a set of spatial features representing a spatial arrangement of the detected elements; and comparison means for comparing the determined set of spatial features to a known set of spatial features and outputting a confidence level measure for a degree of matching between the known set and the determined set of spatial features.

Other aspects of the present invention are also disclosed.

BRIEF DESCRIPTION OF THE DRAWINGS

Embodiments of the present invention will now be described with reference to the drawings, in which.

DETAILED DESCRIPTION

Overview

Figure 1:
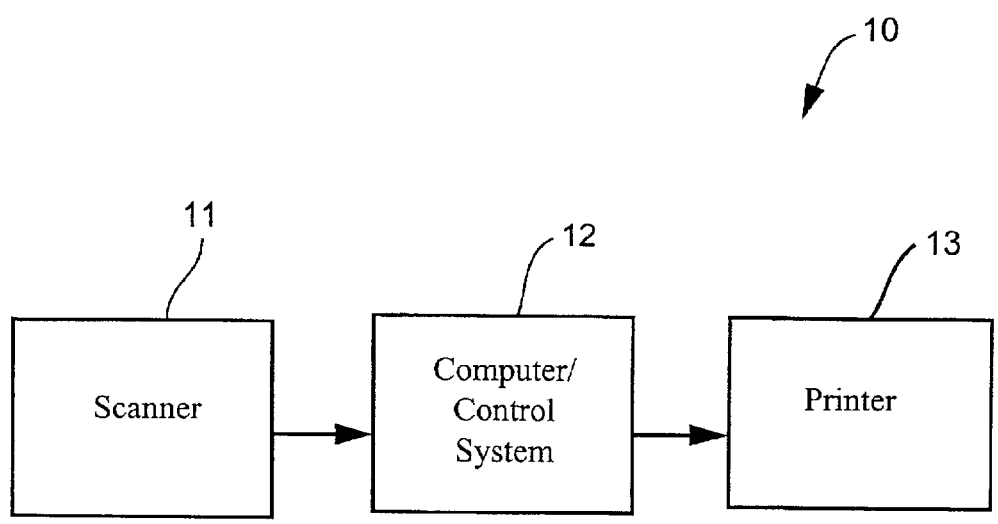
FIG. 1 shows a block diagram of an image reproduction system.

Referring to FIG. 1, there is shown an example of a reproduction system 10 upon which the embodiments of the present invention can be implemented. The reproduction system 10 comprises a scanner device 11, preferably capable of digitally scanning an image to a very high resolution, for example 600 dots per inch (dpi), a computer control system 12, and a printer device 13, for a colour hard copy reproduction of an image scanned by the scanner 11. Examples of such reproduction system include colour photocopying devices such as the Canon CLC 500 Colour Laser Copier sold by Canon Inc. of Japan, and general purpose computer system connected to a scanner device and printer device in the typical manner in which such devices are connected to computer systems. A preferred implementation of the present embodiments comprises hardware incorporated into input devices, such as image scanners, output devices, such as colour printers, or combined devices having both a scanner and printer, such as a photocopier.

The image scanned at the scanner 11 is provided as data, typically on a pixel by pixel basis, to the computer control system 12 which is able to manipulate the scanned image, for instance, by providing filtering, scaling or transforming functions. The resultant pixel image can be fed to a printer 13, again on a pixel by pixel basis, where it is printed on a medium, such as paper. The scanned image from the scanner 11, normally consists of separate colour channel information for each red, green and blue (R,G,B) colour portions of the scanned image, RGB being commonly known as an additive colour format. The printer 13 generally prints out the scanned image using a four pass subtractive colour process. The four pass printing process typically consists of separate passes of Cyan, Magenta, Yellow and Black (CMYK) portions of the image. Whilst the printer normally operates on a four pass process, and the image scanner can, typically, on a single scan obtain the RGB colour portions. A conversion process is applied to convert from one colour space (RGB) to another (CMYK).

Figure 2:
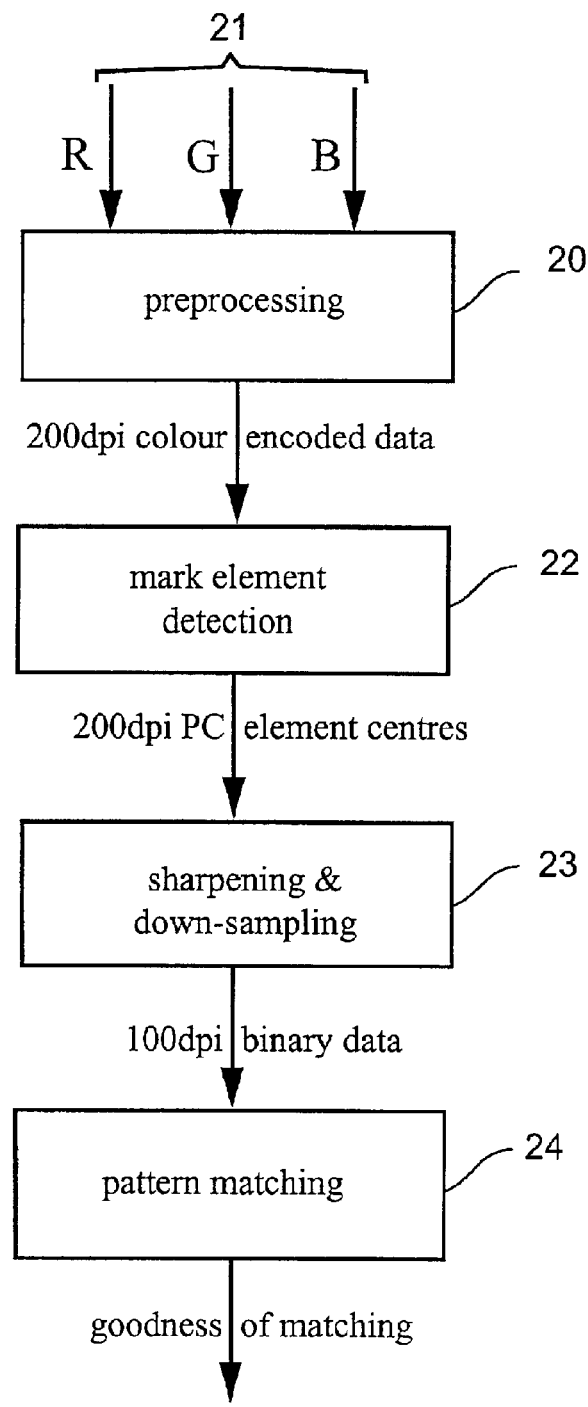
FIG. 2 is a flow-chart of processing steps according to the embodiments of the present invention.

Referring to FIG. 2 there is shown a block diagram representing an overview of the steps processed in accordance with the embodiments of the present invention. An image incorporating thereupon predetermined marking is input, for instance via a digital image scanning device, to a preprocessing step 20. The input image is typically received at the preprocessing step 20 as RGB colour channel information 21 on a pixel-by-pixel basis where the input image is down-sampled and colour encoded. Down-sampling is a process whereby the resolution of an image is reduced to a predetermined level.

Throughout this specification a foreground pixel is to be construed, unless otherwise noted, as a pixel having a pixel (colour) value belonging to a predetermined set of colour values and a background pixel is to be construed, unless otherwise noted, as a pixel not being a foreground pixel.

The preprocessing step 20 provides down sampling and foreground/background filtering of mark elements to be detected as hereinafter described. One advantage provided by preprocessing the scanned image is that a predetermined resolution can be passed to a mark element detection step 22 substantially independent of an input resolution and magnification of the input image. Further, by extracting substantially those features of interest from the input image data (eg. specific colours and background/foreground contrast), an amount of data (bits) required for the encoding of each pixel in relation to these features can be significantly reduced.

Figure 3:
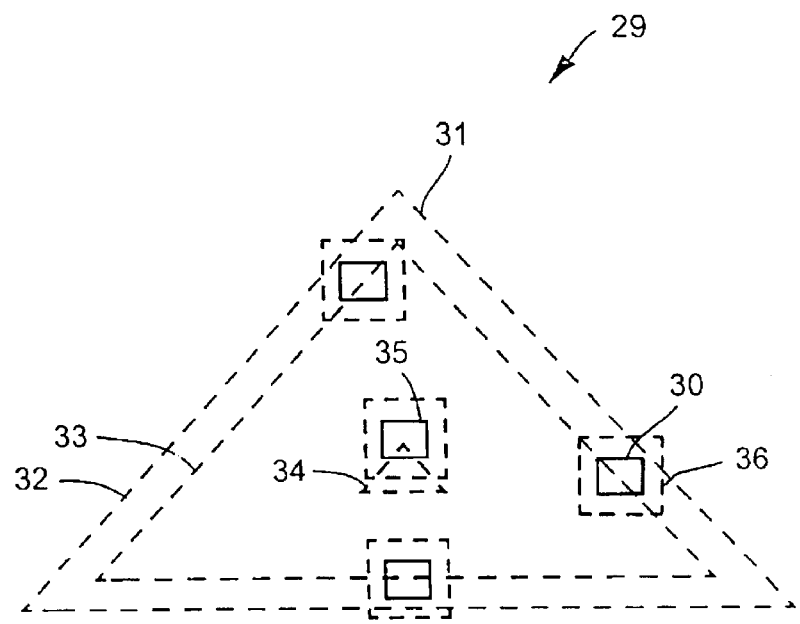
FIG. 3 an example of a mark to be detected in accordance the embodiments of the present invention.
Figure 4:
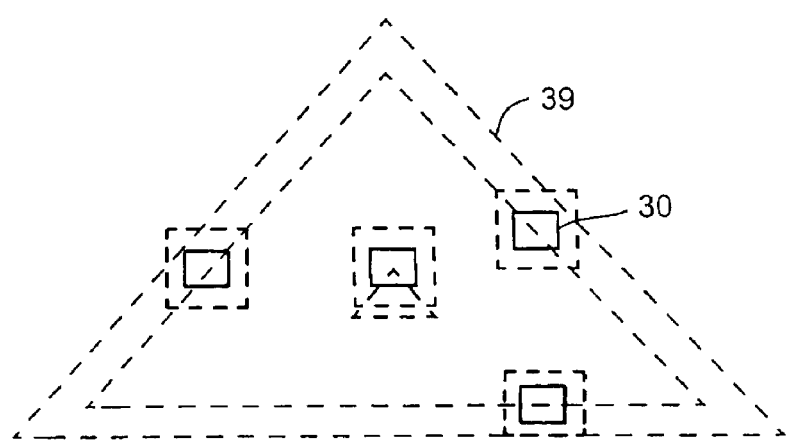
FIG. 4 another example of a mark shown in FIG. 3.

FIG. 3 and FIG. 4 are two examples of marks that are embedded into an image and detected in accordance with the embodiments of the present invention. The illustrated marks are only for the purpose of the description of the embodiments and should in no way be taken as limiting the scope or spirit of the invention.

FIG. 3 shows a mark 29 comprising a plurality of mark elements 30, represented by square shapes, arranged in a predetermined manner on concentric equilateral triangles 31. The concentric equilateral triangles 31 are not intended to form a visible part of the mark 29 other than to indicate a predetermined arrangement of the plurality of mark elements 30. An outer equilateral triangle 32 substantially represents an outer limit of the mark, that is, an outer boundary 32 for which substantially no part of the mark elements 30 should extend beyond this outer boundary 32. An inner equilateral triangle 33 represents a boundary upon which the mark elements 30 are centred. A further inner equilateral triangle 34 represents a positioning of a mark element 35 in relation to the centre of the mark 29. In addition the mark elements 30 are characterised by a predetermined colour scheme which aids in their identification from the surrounding image colours. Preferably, to improve the confidence level in identifying (matching) the mark elements 30 from surrounding image colours, a predetermined colour scheme for the mark elements 30 and a position or location where the mark 29 is embedded in the image is such that substantially no conflicting colours of the image lie within a predetermined perimeter boundary 36 of each of the mark elements 30. That is, it is desirable not to have colours of the image substantially similar to that of a mark element colour within the predetermined perimeter boundary 36 surrounding a mark element 30.

FIG. 4 shows a mark 39 having an alternate arrangement of mark elements. Both the mark 29 of FIG. 3 and the mark 39 of FIG. 4 are embedded into an image and identified from the image, electronically. An advantage, of embedding a mark in an image and then being able to verify the existence of the mark in the image, is to identify the image and if so desired, to prohibit the reproduction of the image containing such marks. Those skilled in the art will recognise that a multitude of marks can be devised without departing from the scope and spirit of the present invention. For example, the mark elements can be circles of a predetermined size and a mark can consist of a predetermined arrangement of such circles.

Referring again to FIG. 2, the process steps in accordance with the embodiments include the mark element detection step 22 which receives information 21 from the preprocessing step 20 and determines whether or not there are mark elements in the image data received. If a mark element is detected, data representing the coordinate position of the centre of the mark element, and preferably a strength value representing a statistical confidence level of a degree of matching between the mark element and a predetermined mask used in the detection is recorded. Preferably, the data representing the coordinate position of the centre of the mark elements is in the form of a bitmap. The bitmap has, for example, a one (1) where a centre of a mark element is detected and zero (0) otherwise. Since a mark element detection, described hereinafter, is based on a thresholding criteria, each mark element may result in more than one centre being detected for each one of the mark elements 30. Therefore, a sharpening filter step 23 is applied to the bitmap to preferably identify one centre in a small cluster of centres caused by the thresholding criteria. If no mark elements are detected, it is assumed that the image does not contain either of the predetermined marks. Next, the sharpened bitmap is further down-sampled 23 before a pattern matching step 24.

Therefore, according to the preferred embodiment the image is scanned at the scanner 11 at a resolution of 600 dpi, down-sampled at the preprocessing step to 200 dpi and colour encoded. The 200 dpi colour encoded image is converted to a bitmap data substantially representing the coordinate position of the centre of the mark elements at 200 dpi. The resulting bitmap is filtered and further down-sampled 23 to 100 dpi before the pattern matching step 24. The down sampling of the input image and/or resulting bitmap is desirable to reduce errors due to small variations in image colours and/or small variations in a mark element centre detection, respectively. Other advantages of down sampling include a reduction in memory requirements, and improvements in processing efficiencies since less bits of the image are processed at the pattern matching step 24 than would be the case if no down sampling was involved. However, embodiments of the present invention can be practised at various resolutions or without down sampling if it is so desired.

At the pattern matching step 24, a region of the down-sampled 23 bitmap is extracted, preferably including one or more mark element locations (centres detected). A resultant output of the pattern matching step 24 is a "goodness fit" measure for a mark. The goodness fit measure is determined on the basis of the number of mark elements detected in the extracted region and on their relative position or orientation to each other. For example, a goodness fit measure can be a percentage value indicating a degree of matching between a known arrangement of mark elements (a known mark) and an arrangement of the detected mark elements (the detected mark).

Preprocessing

Figure 5:
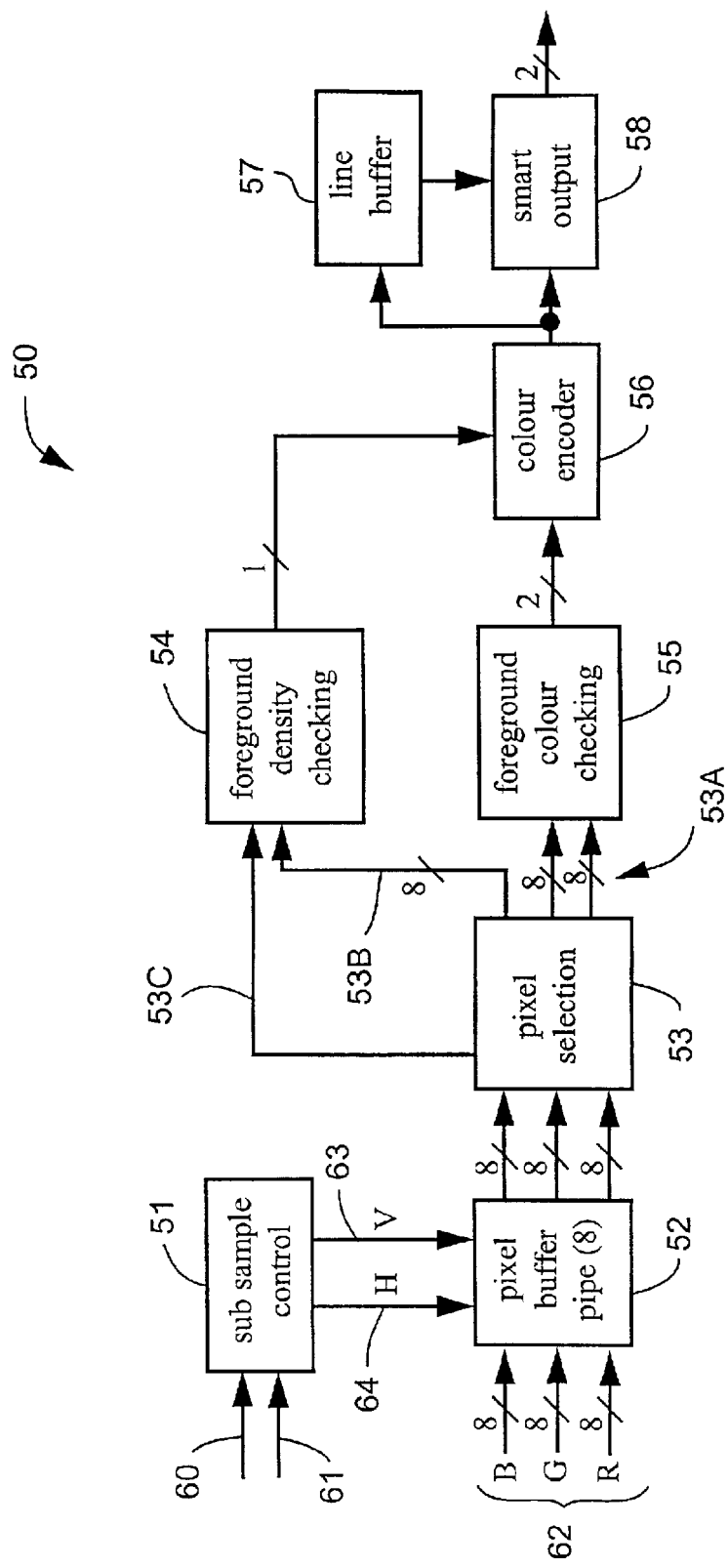
FIG. 5 is a block diagram of a pixel preprocessor in accordance with the preferred embodiment of the present invention.

Referring now to FIG. 5, there is shown a block diagram of a pixel preprocessor 50 for implementing the preprocessing step 20 of FIG. 2. The pixel preprocessor 50 comprises a sub-sample control unit 51, a pixel buffer pipe 52, a pixel selection unit 53, a foreground density checking unit 54, a foreground colour checking unit 55, a colour encoder 56, a line buffer 57, and an interface unit 58, referred to hereinafter as a "smart output" unit.

The sub-sample control unit 51 receives an input resolution value and a magnification value via two input lines 60 and 61 respectively. The input resolution value represents the resolution of an image scanned in at the scanner device 11. Preferably, the input resolution value is the vertical resolution value of the scanned image. The magnification value is a scale factor that has been applied to the scanned image to provide the input image data 62 to the pixel buffer pipe 52. The magnification value represents a reduction or enlargement scaling factor which is typically available on reproduction systems such as colour photocopying machines.

In the horizontal dimension, the resolution of an image is fixed by the resolution of an input scan device (eg. the scanner (11). Typically on a reproduction system such as a colour photocopying machine, the magnification of the image in the horizontal direction is performed in software implemented on the photocopying machine and is typically effected at the output stage before printing or reproduction. In the vertical dimension the magnification of the image is typically effected on a photocopy machine in hardware at the input stage.

The sub-sample control unit 51 determines a corrected input resolution value (hereinafter "corrected resolution value"), for the vertical dimension and horizontal dimension of the scanned input image, from the input resolution value and the magnification value. For example, for an input resolution value of 600 dpi in each dimension and a magnification value of 200 percent, a corrected resolution value is determined to be 1200 dpi in the vertical dimension and 600 dpi (unchanged) in the horizontal dimension.

Thus, the corrected resolution value reflects the resolution of the input image data 62 received as separate colour channels by the pixel buffer pipe 52.

As previously described, one advantage of preprocessing is that it provides to the mark element detection step 22, image data at a predetermined resolution which is substantially independent of the input resolution value and the magnification value of an input image. Thus the pixel preprocessor 50 provides at output a predetermined (desired) resolution substantially independent of a corrected resolution value for each dimension provided the corrected resolution value is greater than or equal to the predetermined (desired) resolution.

It is assumed that corrected resolution values below the predetermined (desired) resolution value result from a scanned input image that does not require mark detection. An example of such an instant may included, where a scanner device is used to scan an image at a low resolution that upon reproducing the scanned image data on a reproduction device such as a printer, the resulting print image is a poor visual reproduction of the scanned in image.

In a preferred embodiment of the present invention the desired, resolution value from the smart output 58 is 200 dpi for each dimension (eg. 200×200 dpi.).

The sub-sample control unit 51 determines an amount of down-sampling required, if necessary, in each of the horizontal and vertical dimensions, based on the corrected resolution value and the desired resolution value (200 dpi) for each dimension. A horizontal down-sample signal 64 (H-signal), if required, and a vertical down-sample signal 63 (V-signal), if required, are each output from the sub-sample control unit 51 to the pixel buffer pipe 52. The pixel buffer pipe 52 then down-samples the input image data 62 in accordance with the H-signal 64 and/or the V-signal 63 from the sub-sample control unit 51. The desired resolution value of 200 dpi in the vertical dimension and 200 dpi in the horizontal dimension to be obtained from the preprocessing circuitry is preferably performed by the pixel preprocessor 50 via an intermediate resolution stage. In the embodiment shown, the pixel buffer pipe 52, instructed by the sub-sample control unit 51, down-samples the input image data 62 to an intermediate resolution, which is further down-sampled to the desired resolution value before being output from the pixel preprocessor 50. In the preferred embodiment, the intermediate resolution value is 400 dpi in each dimension, however the intermediate resolution value can be higher or lower than the preferred value of 400 dpi depending upon a desired output resolution value and a predetermined corrected resolution value. If the corrected resolution value in the vertical dimension is greater than the intermediate value of 400 dpi, a V-signal 63 is generated and sent to the pixel buffer pipe 52 to down-sample the vertical dimension of the input image data 62 to the intermediate value. Otherwise, the corrected resolution value in the vertical dimension is substantially equal to or less than the intermediate value of 400 dpi, in which case a V-signal 63 is generated to the pixel buffer pipe 52 to maintain the current resolution of the input image data 62 out of the pixel buffer 52.

The horizontal resolution of the input image data 62 is also down-sampled, in a substantially similar manner to that described with reference to the vertical dimension, resulting in an intermediate resolution value, of the input image data 62, out of the pixel buffer pipe 52 of 400 dpi.

The horizontal resolution of the input image data 62 is further down-sampled by the pixel selection unit 53 to the desired resolution value of 200 dpi. The down-sampling at the pixel selection unit 53 is performed by selecting m pixels out of n every pixels, of a current scan line, preferably based on a colour characteristic of the selected pixels.

For example, for each pixel pair on a current scan line, the pixel with the lowest intensity value in the blue channel is, preferably, selected from the pixel pair (ie. m=1 and n=2).

Figure 6:
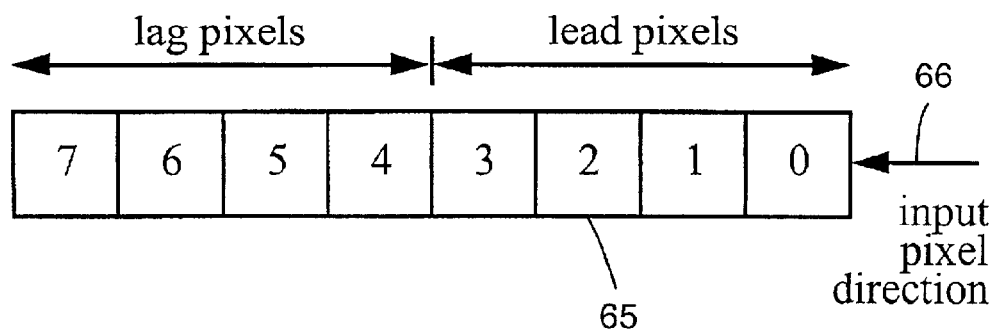
FIG. 6. is a representation of a pixel buffer pipe of the pixel preprocessor of FIG. 5.

Referring to FIG. 6, there is shown a representation 65 of eight (8) consecutive horizontal pixels stored (temporarily) in the pixel buffer pipe 52 of FIG. 5. For the purpose of simplicity and clarity of description, the eight (8) consecutive horizontal pixels of a current scan line are labelled zero (0) to seven (7). An input direction 66 of the current scan line is also shown in FIG. 6. Thus, according to the input direction, the first pixel to enter the pixel buffer pipe 52 is labelled pixel seven (7), while the last pixel to enter the buffer pipe 52 is labelled pixel zero (0).

In addition to down-sampling, the pixel buffer pipe 52 is used to detect foreground pixel to background pixel transitions and vice versa. Preferably, a foreground pixel is an input image pixel pertaining to a mark element 30 and a background pixel is an input image pixel not pertaining to a mark element 30.

A foreground pixel is distinguished from a background pixel by colour the characteristics of a mark element 30. Thus, a foreground to background pixel transition or a background to foreground pixel transition on a current scan line represents a mark element intersecting the scan line.

The length of the pixel buffer pipe 52, that is, the number of consecutive horizontal pixels stored in the pixel buffer pipe 52, preferably depends on the width of a mark element outline, measured in pixels, at the operating resolution of the pixel buffer pipe 52 (ie. the intermediate resolution value —400 dpi). Accordingly, the representation 65 of FIG. 6 assumes a mark element outline width that is, at most, half the length of the pixel buffer pipe 52 (ie. 4 pixels).

In FIG. 6, pixels labelled zero (0) to three (3) are referred to as "lead pixels" and pixels labelled four (4) to seven (7) are referred to as "lag pixels". Additionally, a current pixel position of the pixel buffer pipe 52 is selected as either pixel positions labelled three (3) or pixel position labelled four (4) depending on a colour characteristic of either pixel. For example, a current pixel processing position of the pixel buffer pipe 52 is selected to be either pixel position labelled three (3) or pixel position labelled four (4) depending on whichever position has a corresponding pixel with a higher intensity in the blue channel.

A background pixel to foreground pixel transition is detected when a weighted average of intensity value of the lag pixels is greater than a weighted average of intensity values of lead pixels by a first threshold value. Preferably, the intensity value of the lag or lead pixels are selected from a colour channel which predominantly distinguishes each pixel as either foreground or background. The first threshold is, preferably, a predetermined function of the weighted average intensity values of the lag pixels. In a substantially similar manner a foreground to background pixel transition is detected, by the pixel buffer pipe 52, when a weighted average of intensity value of the lead pixels is greater than a weighted average of intensity value of the lag pixels by a second threshold value. The second threshold value is, preferably, a predetermined function of the weighted average of intensity values of the lead pixels.

When a background to foreground pixel transition is detected, a foreground transition signal is set high and a counter is initialised to count pixels following the transitions. The foreground transition signal is communicated to the foreground density unit 54, via a separate line 53C. The foreground transition signal is maintained high until either a foreground to background pixel transition is detected or the counter has counted a predetermined number of pixels, in which case the foreground transition signal is made low. The counter is used as a safety measure in case a foreground to background pixel transition is erroneously not detected, without the counter the foreground transition signal will be maintained high incorrectly, in the event that a foreground to background pixel transition is not detected. The predetermined number of pixels counted by the counter before setting the foreground transition signal to low is preferably the number of pixels in the width of a mark element 30. The counter is cleared upon the foreground transition signal being set low and re-initialized to count pixels upon setting the foreground transition signal high.

Following the pixel selection unit 53, one colour channel 53B, the colour channel which predominantly distinguishes between foreground and background pixels (eg. blue channel), is input to the foreground density checking unit 54. Remaining colour channels (eg. Red and Green channels) 53A are input to the foreground colour checking unit 55.

The foreground density checking unit 54 compares an intensity of the single colour channel for each pixel against two threshold values, a background threshold value and a foreground threshold value, and outputs a one (1) or zero (0) for each pixel according to one of three conditional rules.

The conditional rules for the output of the foreground density checking unit 54 are based on the intensity value of a current pixel. If the intensity of a pixel is:
1) equal to or greater than the foreground threshold value, output a one (1) for the pixel;
2) equal to or below the background threshold value, then output a zero (0) for the pixel; or
3) below the foreground threshold value and above the background threshold value, then output a one (1) when the foreground transition signal is high and a zero (0) when the foreground transition signal is low.

The binary output of the foreground density checking unit 54 is communicated to the colour encoding unit 56.

The foreground colour checking unit 55 takes as input the remaining two colour channels 53A from the pixel selection unit 55 and classifies each pixel of the image data into one of a plurality of allowable colours for a foreground pixel or classifies the pixel colour as "invalid", representing a background pixel. In the preferred embodiment of the invention two bits are assigned to each colour classification, resulting in three allowable colour classifications for a foreground pixel and one invalid colour classification for a background pixel. The binary representation for each colour classification is shown in Table 1.

TABLE 1

| Colour | Binary Representation |
| --- | --- |
| invalid colour (background) | 0 0 |
| colour 1 (foreground) | 0 1 |
| colour 2 (foreground) | 1 0 |
| colour 3 (foreground) | 1 1 |

Figure 7:
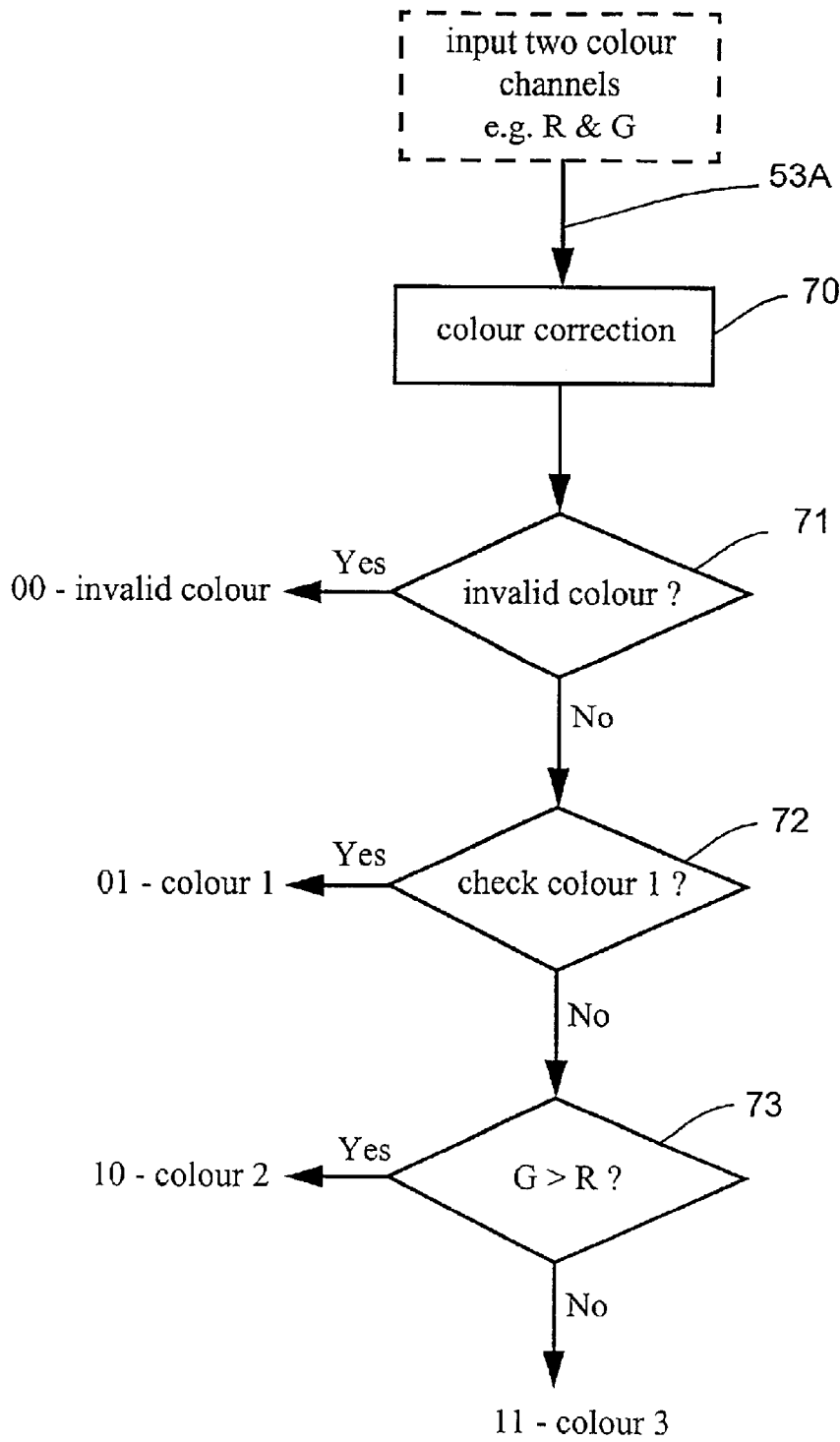
FIG. 7 is a flowchart of a colour classification process use in the pixel preprocessor of FIG. 5.

Referring to FIG. 7, there is shown a flowchart for the algorithm implemented by the foreground colour checking unit 55 for classifying each pixel of the image data into one of the colour classifications of Table 1.

In the algorithm of FIG. 7, it is assumed that the colour channel output from the pixel selection unit 52 and input 53B to the foreground density checking unit 54 is the blue channel and the remaining colour channels, namely red and green, are input 53A to the foreground colour checking unit 55. The input 53A red and green channels are colour corrected 70 to remove possible high frequency effects (AC effects) or artifacts resulting from limitations of the scanning device 11. An example of such artifacts are colour distortions caused by a modulation of spatial frequencies of an input image with a sampling limit (spatial frequency) of the scanning device 11.

Whilst all AC effects are not known a priori, observations of scanned image test patterns have shown that, at least in part, AC effects can be reduced by applying a transformation mapping to the intensity of input image data. An example of such transformation mapping is given by the following Equation (1) below:

$$F = \frac{F^1 - B \cdot ACF}{1 - ACF}, \quad (EQ\ 1)$$

where F is an intensity value for a foreground pixel of an input image without AC effects, $F^1$ is an intensity value for a foreground pixel with AC effects, B is the intensity value for a background pixel and ACF is an AC effect factor which has a value between zero and one (ie. 0<ACF<1). Thus, the colour correction step 70 applies a colour correction to the red and green channel of each pixel in accordance with Equation (1).

Next, an invalid colour decision step 71 is applied which checks whether or not the red and green channels for a pixel are above desired thresholds. If a result of the invalid colour decision step 71 is true, that is, both the red and green channels are above the desired thresholds then the binary code (00) for an invalid colour is output by the foreground colour checking unit 55. Otherwise, the decision step 71 returns a false, in which case a second decision step 72 is entered which determines whether or not the red and green channels for the pixel are within a predetermined range of values acceptable as colour 1 from table 1. If the second decision step 72 returns true, that is, the intensity values for the red and green channels of the pixel are within the tolerance specified for colour 1, the foreground colour checking unit 55 outputs the corresponding binary code (01) for the colour 1. However, if the second step 72 returns false, a third decision step 73 is entered. The third decision step 73 determines whether or not the red and green channels are within a predetermined range of values acceptable as colour 2. If the third decision step 73 returns true, the corresponding binary code (10) for colour 2 is output, otherwise the binary code (11) for colour 3 is output by the foreground colour checking unit 55.

Referring back to FIG. 5, the colour encoding unit 56 receives the colour encoded two bit binary output from the foreground colour checking unit 55 and a one bit binary output from the foreground density checking unit 54 which is used to conditionally toggle switch between the invalid colour (00) and the output of the foreground colour checking unit 55. That is, when the output of the foreground density checking unit 54 is zero (0), then the output of the colour encoder 56 is the binary code (00) for the invalid colour, irrespective of the output of the foreground colour checking unit 55. When the output of the foreground density checking unit 54 is one (1) then the output of the colour encoder 56 is the same as the output from the foreground colour checking unit 55.

As previously described, the resolution in the horizontal dimension out of the pixel selection unit 55 is the desired resolution value (eg. 200 dpi). However, in the vertical dimension the resolution out of the pixel selection unit 55 can be a value between the intermediate resolution value (eg. 400 dpi) and the desired resolution value (eg. 200 dpi) or equal to either of these resolution values. Whilst the colour coding format (eg. two bit binary) output from the colour encoding unit 56 is a different colour coding format to that of the input image data (eg. RGB 8-bits per channel), the output resolution in each dimension from the colour encoding unit 56 is substantially similar to the resolution output from the pixel selection unit 53.

When the vertical resolution output by the colour encoding unit 56 is equal to the desired resolution value (eg. 200 dpi) then the line buffer unit 57 is disabled and the output from the colour encoding unit 56 is directed through the smart output 58. However, when the vertical resolution is greater than the desired resolution value, (scan) lines of encoded pixel data from the colour encoding unit 56 are buffered through the line buffer 57 in such a manner as to provide an output resolution from the smart output unit 58 at the desired resolution value.

An optional feature of the smart output unit 58 is that of monitoring pixels of a current output scan line and outputting, for each current pixel of the scan line having an invalid colour code (00) value, a corresponding pixel in a previous (adjacent) scan line buffered in the line buffer 57.

For instance, if a current pixel is the fourth pixel of a current output scan line and the pixel has an invalid colour value (00) then the smart output unit 58 outputs for the current pixel a value corresponding to the colour value of the fourth pixel of a previous (adjacent) output scan line. The previous (adjacent) output scan line is buffered in the line buffer unit 57. This optional feature of the smart output unit 58 is only available when the line buffer unit 57 has not been disabled, and is used to stabilise the output of the pixel preprocessor 50 against unwanted artifacts resulting from fine horizontal lines in an input image (if any are present).

Mark Element Detection

In the preferred embodiment of the present invention the mark elements are detected using a binary morphological filtering approach. Morphological filters extract image components that are useful in representing and describing region shapes. Such image components include boundaries, skeletons and convex hulls, to name but a few. The preprocessing of the input image, as previously described, yields a coded representation that discriminates between foreground and background pixels. Based on this coded representation, a mark element detection step 22 can examine many more pixels of the input image data for a fixed memory requirement, since each pixel is represented by one or two bits.

Figure 8:
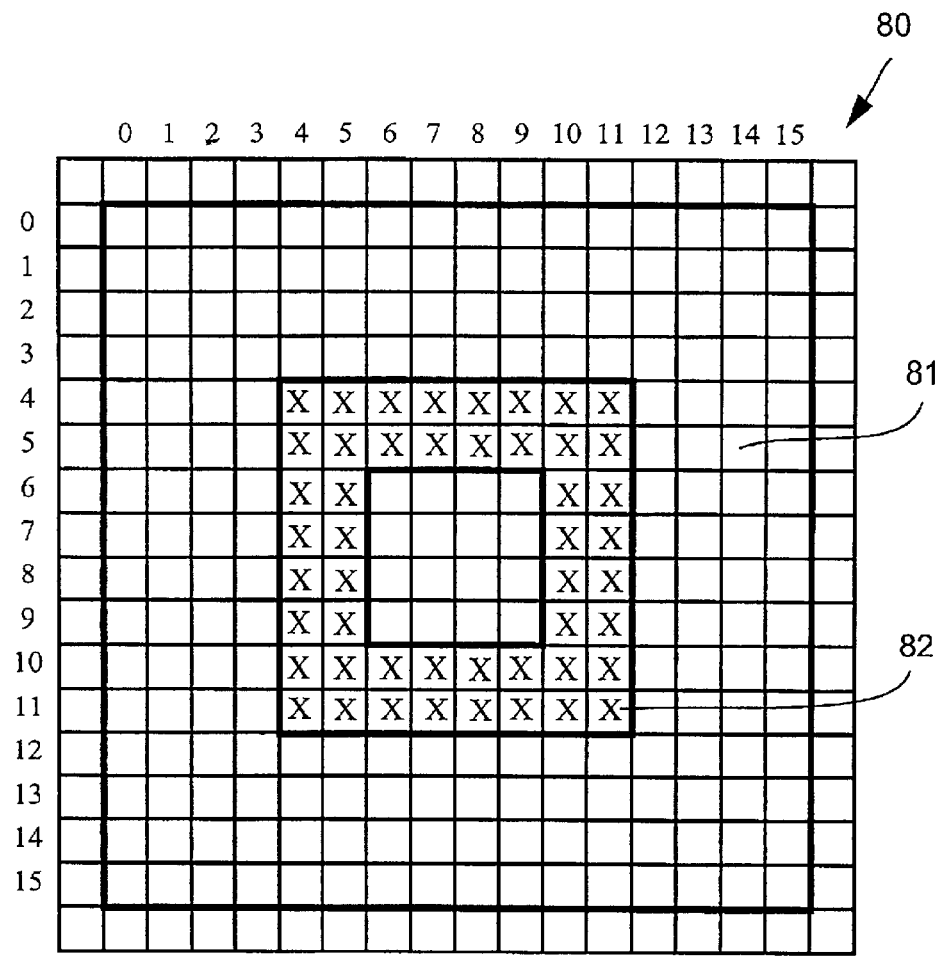
FIG. 8 is a representation of a mark element detection mask according to the preferred embodiment.

Referring to FIG. 8, there is shown an element detection mask 80 for detecting the mark elements 30 of FIG. 3 or FIG. 4. The element detection mask 80 is a window of 16×16 cell locations 81 which correspond to pixel locations of a 16×16 array of pixels from the coded representation output from the preprocessing step 20. That is, the element detection mask 80 represents the pixel locations of a 16×16 portion of the sub-sampled image resulting form the preprocessing step 20. The dimensions of a mask (or window) are typically determined by features such as, processing capabilities, the size in pixels of a mark element to be detected and a spacing between mark elements. A convenient size for the element detection mask 80 of the present embodiment is a 16×16 cell matrix.

Predetermined cell locations of the element detection mask 80 shown in FIG. 8 are labelled with the letter "X" 82. The x-labelled cells 82 indicate cell locations which are to substantially coincide with foreground pixels for a mark element to be detected.

Figure 9:
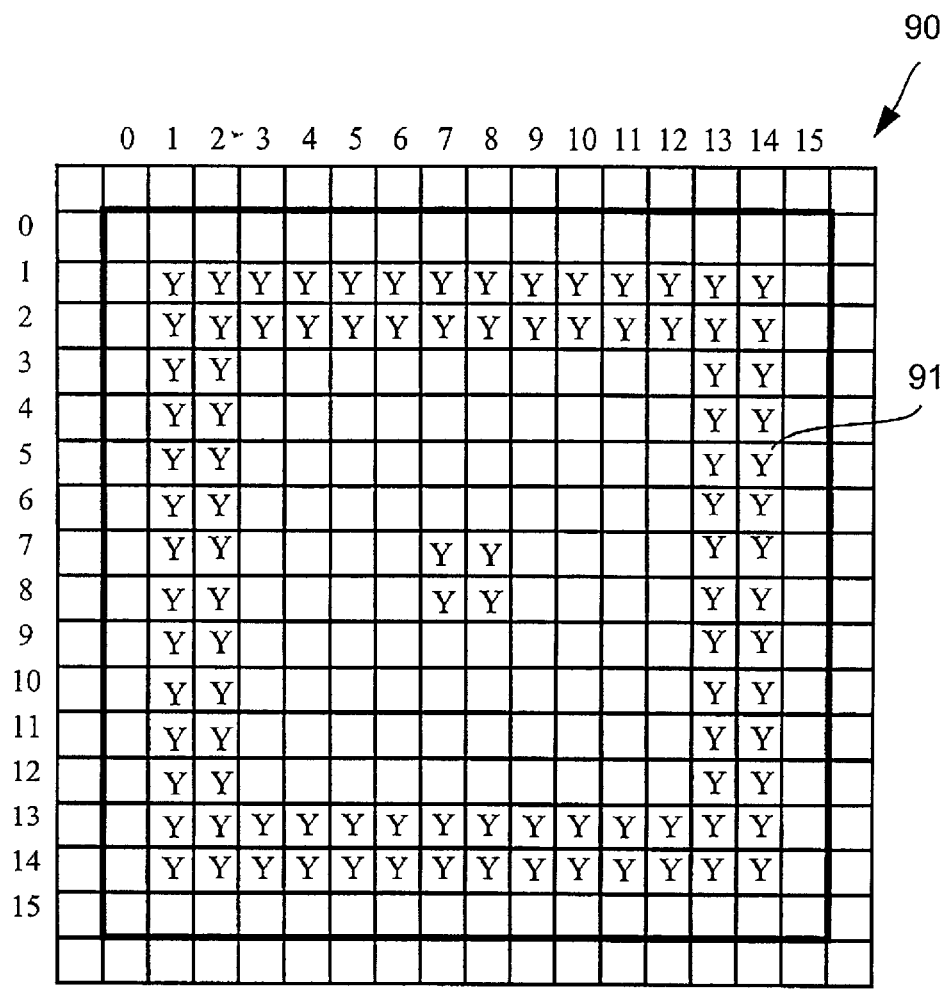
FIG. 9 is a representation of a void element detection mask according to the preferred embodiment.

FIG. 9 shows a second mask 90, referred to hereinafter as the "void element mask". The void element mask 90 is substantially similar to the element detection mask 80, excepting that predetermined cell locations are labelled with the letter "Y" and the y-labelled cell locations do not correspond to the cell locations 82 of the element detection mask 80 labelled "x". That is, when the void element mask 90 is overlaid upon the element detection mask 80 at corresponding cell location there is substantially no overlap of the y-labelled cells with the x-labelled cells of the masks 90 and 80 respectively.

A characteristic feature of each mark element 30 is that within a predetermined perimeter boundary 36 of each element there are substantially no foreground pixels other than those foreground pixels pertaining to the mark element 30 itself. The void element mask 90 is used to provide a degree of confidence in detecting a mark element 30 by checking for this characteristic feature. That is, the void element mask 90 is used to determined whether or not pixels surrounding a mark element and preferably at the centre portion of the mark element are substantially background pixels.

The element detection mask 80 and the void element mask 90 are used together to detect mark elements 30 embedded an input image. Both masks 80 and 90 are applied to a portion of the encoded image resulting from the pre-processing step 20. On application of the element detection mask 80 to a portion of the encoded image a first score is determined and a second score value is determined for an application of the void element mask 90 on the same portion of the encoded image. The first and second score values are thresholded against a first and second threshold value respectively. If both score values exceed their corresponding threshold value a one (1) is recorded, otherwise a zero (0) is recorded. The masks 80 and 90 are translated to another portion of the encoded image and the process of determining the score values, thresholding the score values and recording a one (1) or zero (0) is repeated.

The mark element detection step 22 proceeds until both masks 80 and 90 have processed each pixel of the encoded image resulting in a binary bitmap comprising a one (1) at substantially each position of the bitmap representing a centre location of a mark element, and zero (0) otherwise.

For rotationally invariant mark elements (eg. circular mark elements) only a single pass, on each pixel, of the mark element detection step is required to produce a bitmap representation of centre location of the mark elements. However, for mark elements that are not rotationally invariant, several passes of the mark element detection step 22 are required to account for a possibility of one of a plurality of rotation angles for which an image may be scanned in at the scanner device 11. For each of the several passes a modified element detection mask and a modified void element mask is applied.

The modified element detection mask and the modified void element mask for each of the several passes is determined from a specified rotation of the element detection mask 80 and the void element mask 90 respectively. For example, in detecting a square mark element 30 (FIG. 3 or FIG. 4) an effective number of (modified) element detection masks and (modified) void element masks is 16, one for each 6 degree rotation from 0 degrees to 90 degrees inclusive.

Bitmaps produced from each of the several passes of the mark element detection step 22 (ie. one pass for each 6-degree rotation) are combined to produce a single bitmap representation which is sent to the sharpening and down-sampling step 24.

The mark element detection step 22 of the preferred embodiment is hereinbefore described with reference to two detection masks 80, 90, however, the mark element detection can be performed with a single mask combining the attributes of the mark element detection mask 80 and the void element mask 90. That is, in practise, the element detection mask 80 and the void element mask 90 for detecting a mark element, can be implemented in parallel without departing from the scope and/or spirit of the present invention.

Returning to FIG. 2, the bitmap representing centre location of mark elements is preferably sharpened with a sharpening filter and further down-sampled 23 to reduce possible ambiguities in the centre locations introduced by the mark element detection step 22. The down-sampled sharpened image is processed then by a pattern matching step 24 which determines whether or not the mark elements are in a correct pattern arrangement in accordance with the mark to be detected (eg. FIG. 3 and/or FIG. 4). The pattern matching step 24 provides a measure indicating a "goodness of fit" between a detected mark and a predetermined "known" mark and communicates the measure value to an evidence combiner step (not shown in FIG. 2) which determines whether to enable or disable specific features such as copying on a photocopier. The evidence combiner may operate in a number of ways depending upon the particular application. In a simple application, the measure of pattern matching may simply be compared with a predetermined or user definable threshold to either enable or desirable the feature, such as copying.

Pattern Matching

Once centre locations of the mark elements 30 have been detected and represented on a bitmap, an arrangement of the centre location is checked against known arrangements (marks of FIG. 3 and of FIG. 4) and a confidence value or a "goodness of fit" measures is determined.

Figure 10:
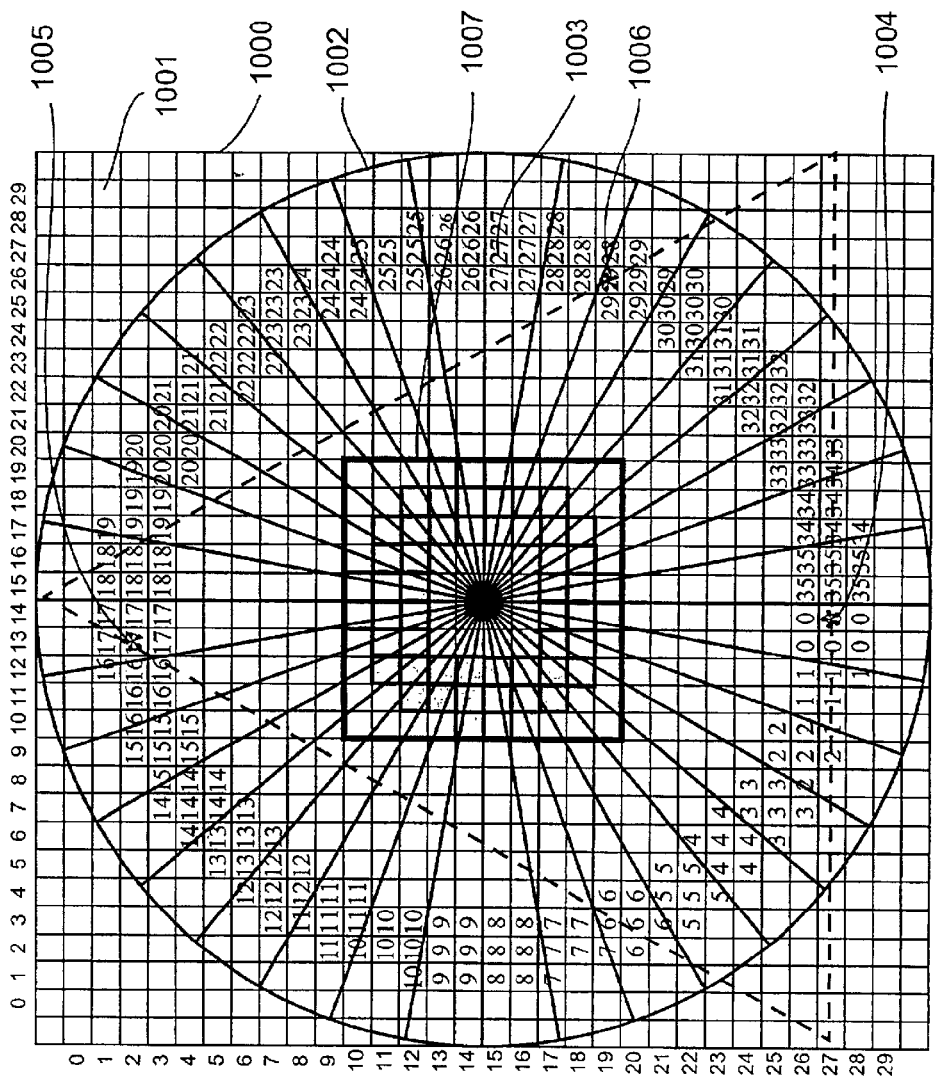
FIG. 10 is a representation of a signature detection mask used in the preferred embodiment of the present invention.

Referring to FIG. 10, there is shown a signature detect mask 1000 comprising 32×32 matrix cells 1001 which is used by the pattern matching step 24 for determining an outer ring signature for an arrangement (or pattern) of mark element centres. In addition FIG. 10 shows a circular region 1002 divided into 36 ten degree sectors labelled 0 to 35. The signature detect mask 1000 represents a 32×32 pixel region of the sharpened, down-sampled bitmap resulting from the mark element detection step 22.

A predetermined number of matrix cells (shown shaded) arranged in a circular ring pattern 1003 are used to determine an outer ring signature for each mark (FIG. 3 or FIG. 4). Overlaid upon the signature detect mask 1000 of FIG. 10 there is also shown the outer mark elements 30 of the mark pattern arrangement of FIG. 3. A centre location of the outer mark elements of the pattern arrangement of FIG. 3 are shown coincident with three mask cells, on the circular ring pattern 1003, one 1004 at sector 0, one 1005 at sector 17 and one 1006 at sector 29.

Figure 11:
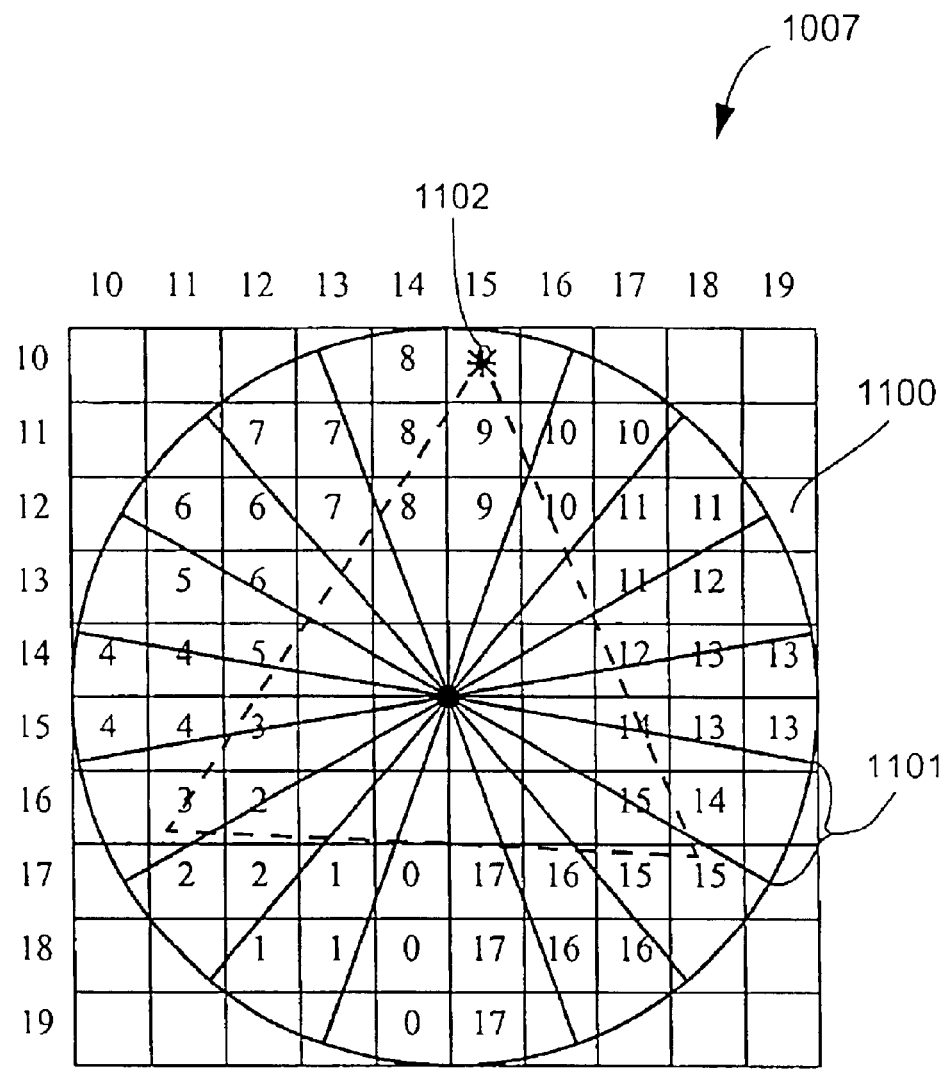
FIG. 11 is a centre portion of the signature detection mask of FIG. 10 in more detail.

Referring to FIG. 11, there is shown a central 10×10 cell portion 1007 of the signature detect mask 1000 of FIG. 10 in more detail. The central portion 1007 is used to determine an inner ring signature for a mark, indicating a position of a centre mark element relative to the outer mark elements 30 of a mark. FIG. 11 shows a circular portion 1100 preferably divided into 18 sectors 1101, each sector spanning a 20-degree angle about the centre of the signature detect mask 1000 of FIG. 10. The angle spanned by a sector of the central portion 1007 is greater than the angle spanned by a sector of the circular region 1002 so as to increase the sensitivity of the angular resolution (eg. pixels per degree). Also, shown in FIG. 11 is a centre location 1102 of the central mark element shown in the mark pattern arrangement of FIG. 3.

Figure 12:
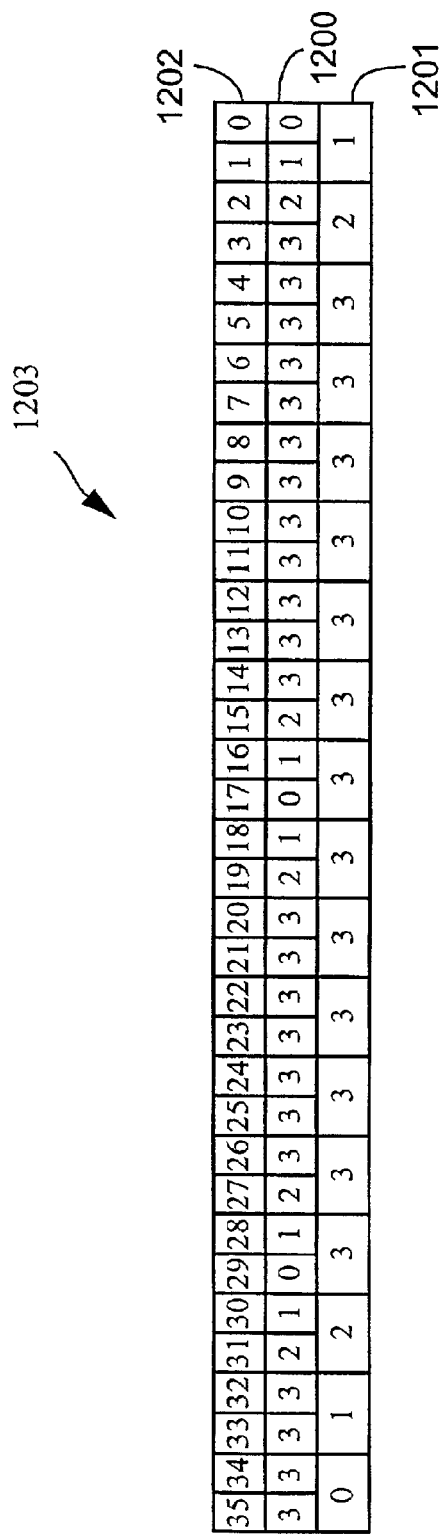
FIG. 12 represents the outer and inner ring signature of the sample mark shown in FIG. 3.

By way of example, FIG. 12 shows an outer ring signature 1200 and an inner ring signature 1201 for the mark shown in FIG. 3. A first row 1202 of the table 1203 in FIG. 12 represents the labels of each sector shown in FIG. 10. A second row represents the outer ring signature 1200 for the outer mark elements 30 and a third row of the table 1203 represents an inner ring signature of the central mark element of FIG. 3.

The outer 1200 and inner 1201 ring signatures comprise a plurality of error measures (or distance measures) values which indicate how close a sector is to a sector containing a mark element centre. For example, at one extreme, a zero (0) error measure value indicates that a mark element centre location is within the corresponding sector and at another extreme, an error measure value of three (3) indicates that the corresponding sector is far removed from a sector containing a mark element centre location. Between these two extreme values are error measure values one (1) and two (2) which indicate that the corresponding sector is distant (removed) from a sector containing a mark element centre location but not quite as much as that indicated by the error measure value three (3). The error measure value can be mapped to values other than the values 0 to 3 without departing from the scope and spirit of the present invention.

The signature detect mask 1000 (FIG. 10) is applied to an encoded image one pixel at a time and an outer and inner signature is determined at each application. The signatures determined on each application are compared with a plurality of expected "known" signatures for each mark represented in FIG. 3 and FIG. 4. The plurality of expected "known" signatures comprise a signature for each possible (10-degree) rotation of each mark of FIG. 3 and FIG. 4.

At each comparison between the determined signatures and the known signatures a confidence level or "goodness of fit" measure is determined. The confidence level or "goodness of fit" measure is thresholded by an evidence combiner to determine whether or not an input device (eg. scanner) or an output device (eg. printer) or a combination of such devices (eg. photocopier) will enable a copying of an input image.

Figure 13:
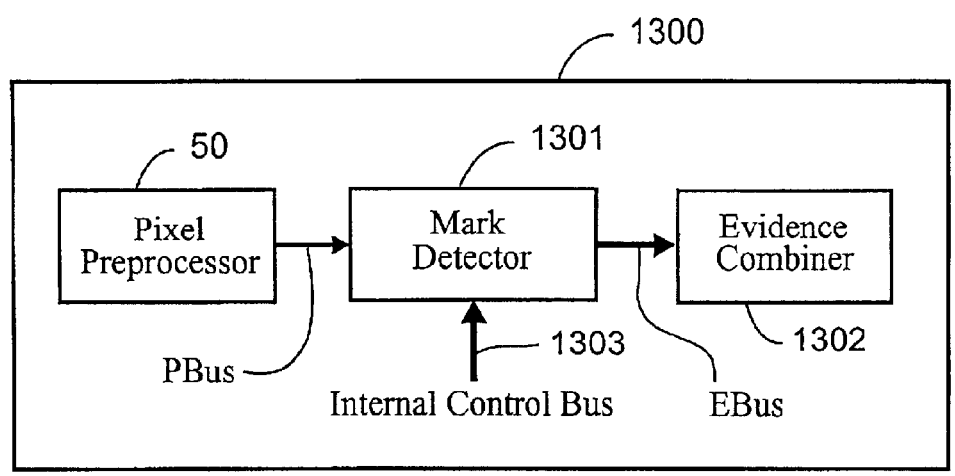
FIG. 13 is an overview diagram of a detection apparatus according to the preferred embodiment.

Referring to now FIG. 13, there is shown a block diagram of a mark detection apparatus 1300 according to the preferred embodiment of the present invention. The mark detection apparatus 1300 comprises the pixel preprocessor 50 (FIG. 5), a mark detector 1301 for performing the mark element detection 22, the down-sampling and sharpening 23 and the pattern matching step 24 of FIG. 2, and an evidence combiner module 1302. The mark detector 1301 has an internal control bus 1303 accessible to an external microprocessor (not illustrated) and includes substantially all the necessary memory and logic to detect marks, preferably in real time.

The mark detector 1301 takes its input from the pixel preprocessor 50 and provides detection probability data to the evidence combiner module 1302. The evidence combiner module 1302, from the detection probability data (ie. goodness of fit measure), determines whether the photocopier is to allow an image to be copied. A microprocessor interface allows RAM and registers within the mark detector 1301 to be accessed from the external microprocessor.

The mark detector 1301 uses both a photocopier input clock, pclk and a high frequency synthesised clock, hclk. The photocopier input clock pclk is used at the front end where pixel rate processing is possible, while the synthesised clock hclk is needed in a pattern matching detector section described hereinafter to improve processing throughput hclk is preferably three times the note of pclk. Table 2 below lists some of the clocks and global signal definitions.

TABLE 2

| Name | Type | Definition |
| --- | --- | --- |
| Pclk | input | Photocopier input clock (1–25 MHz) |
| Hclk | input | Derived high frequency clock (2–200 MHz) |
| Prst | input | Global reset synchronized to pclk |
| Hrst | input | Glob reset synchronized to hclk |

The global reset signal hrst is synchronous to the synthesised clock hclk and global reset signal prst is synchronous to the photocopier input clock pclk. Both resets preferably clear all state machines and registers in the circuits clocked by the respective clocks.

Registers and memory data areas within the mark detector 1301 are able to be read and written via the internal control bus from the external microprocessor. In addition they can be written by a data supply unit.

A pixel bus (PBus) conveys pixel information in real-time from the photocopier via the pixel preprocessor to the mark detector 1301 and an evidence combiner bus (EBus) conveys evidence information from the mark detector 1301 to the evidence combiner module 1302.

Figure 14:
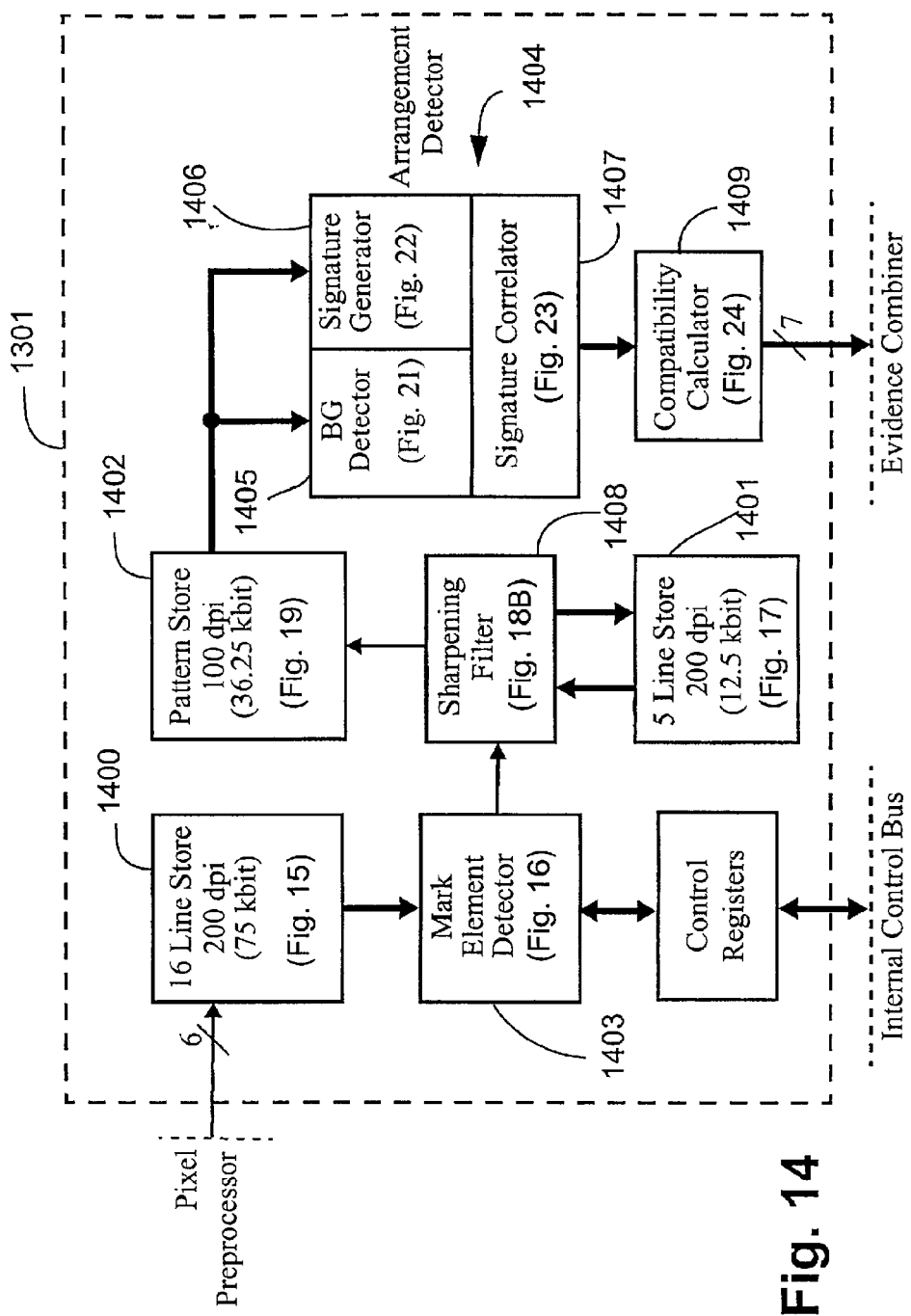
FIG. 14 is a block diagram of the mark detector unit shown in FIG. 13 in more detail.

The mark detector module 1301 is shown in more detail in FIG. 14 and is where each mark (FIG. 3 and FIG. 4) is detected. The mark detector 1301 comprises two line stores 1400,1401, a pattern store 1402 and logic required to scan an incoming pixel stream in real-time and detect both mark elements and marks (ie. entire mark element pattern arrangement) and report detection probabilities to the evidence combiner module 1302.

The preprocessed pixel data is written into the 16-line store 1400 in real time and read out in lock step with the input data stream. A mark element detector 1403 scans the pixel data in the 16-line store 1400, looking for the mark elements 30 of FIG. 3 and FIG. 4. Once located, mark element centres are stored in the pattern store memory 1402 after down-sampling to a predetermined resolution (preferably 100 dpi). Enough lines of down sampled pixel data are stored, in the pattern store 1402, to hold a mark at any (allowable) rotation. An arrangement detector 1404 (comprising background detector 1405, signature generator 1406 and signature correlator 1407) looks for the two possible marks (FIG. 3 and FIG. 4) and determines a correlation error. A compatibility calculator 1409 converts the correlation error into a compatibility percentage value (goodness of fit measure) which is passed to the evidence combiner 1302.

Figure 15:
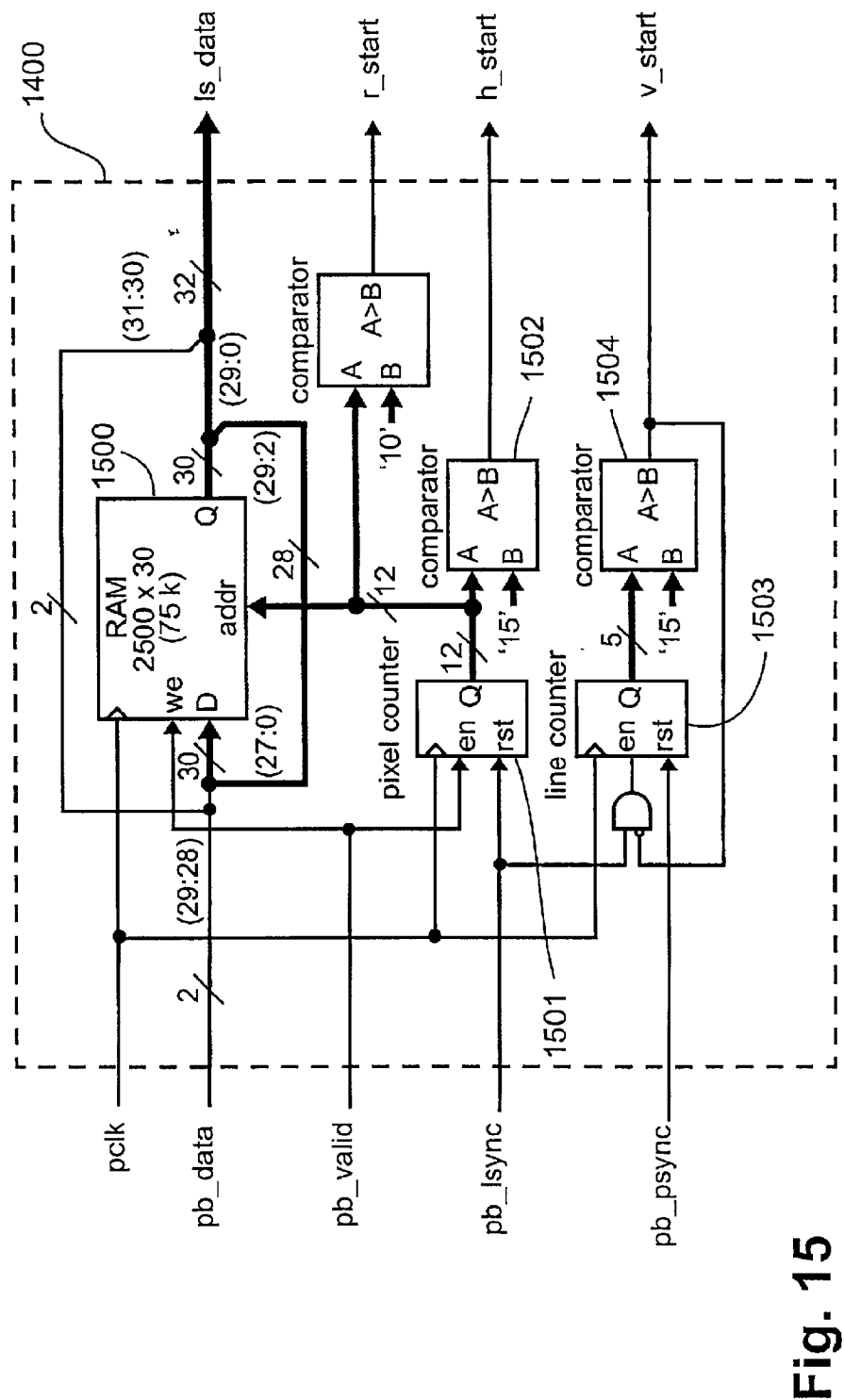
FIG. 15 is a schematic diagram of a (16-line) line store of the mark detector unit of FIG. 14.

Turning now to FIG. 15 there is shown a more detailed diagram of the 16-line store 1400 of FIG. 14. The pixel bus (Pbus) provided by the pixel preprocessor 50 provides data, as well as clock and synchronisation signals as will be appreciated by those skilled in the art, those signals forming inputs to the 16-line store 1400 of FIG. 8. It will also be appreciated that certain clock control and synchronisation signals will pervade the mark detector module 1301 and, for the same of clarity, are not depicted in FIG. 14 or in other of the drawings where their corresponding presence and functionality would be well understood by those skilled in the art. A random access memory (RAM) array 1500 stores fifteen complete lines of pixel (video) data at 200 dpi with just 2 bits per pixel resulting from the pixel processor 50. This comprises 2500 words of 30 bits per word. The RAM array 1500 is configured to periodically execute read-modify-write cycles with a 2-bit rotation. New, incoming 2-bit data is merged with the bottom 28 bits of the data read from the RAM 1500 at the same address before being written back into the RAM 1500. The full 30-bit word read out of the RAM 1500 is passed on to the mark element detector block 1403 along with the two incoming bits from the pixel preprocessor 50.

A 12-bit pixel counter 1501 tracks addresses within the RAM array corresponding to pixel position along a line of pixel data. Writing into the RAM is enabled during the active line time. The counter 1501 is enabled at the same time and is reset at the start of each line.

A first comparator 1502 is used to assert an h_start signal which indicates the horizontal start of when element detection should begin in the horizontal direction. A line counter 1503 is reset at the start of each page and is incremented at the start of each line. A second comparator 1504 is used to generate a v_start signal which is used to indicate the start of when element detection should commence in the vertical direction.

Returning to FIG. 14, the mark element detector 1403 operates on the 32-bit data stream from the 16-line store 1400 in chunks of 16 words at a time. Conceptually, the detector 1403 stores a 16×16 array of pixels (2 bits per pixel) and applies each of two masks 80,90 to the image data. As previously described in the Mark Element Detection section, one mask, the element detection mask 80, is used to detect foreground (coloured) pixels and another mask, the void element mask 90, is used to detect background (coloured) pixels.

Each cell position of the element detection mask 80 label with an 'X' contributes to the detection calculation. For each of these cells, if a foreground pixel is detected, one is added to a total count of foreground hits. Typically, for marks having mark elements of more than one colour a total count of foreground hits for each colour is recorded. If the total number of foreground hits (per colour) exceeds a threshold value, then a foreground element is detected.

Again as previously described the void element mask 90 is used to detect background (coloured) pixels and each cell position labelled with a 'Y' contributes to the detection calculation. For each of these cells, if a foreground pixel is detected, one is added to a total count of background hits per complementary colour. Again for each mark element colour there can be a complementary background colour which is not in conflict, for the purpose of detection, with the mark element colour. If the total number of background hits (per colour) exceeds a threshold value, then a background element is detected. Cells labelled with a 'Y' at the centre of the void element mask 90 (FIG. 9) are preferably detected separately to the peripheral Y-labelled cell of the void element mask 90.

A mark element 30 is considered detected when both the foreground element and the background element are detected upon the same portion of image data.

Figures 16, 16A, 16B:
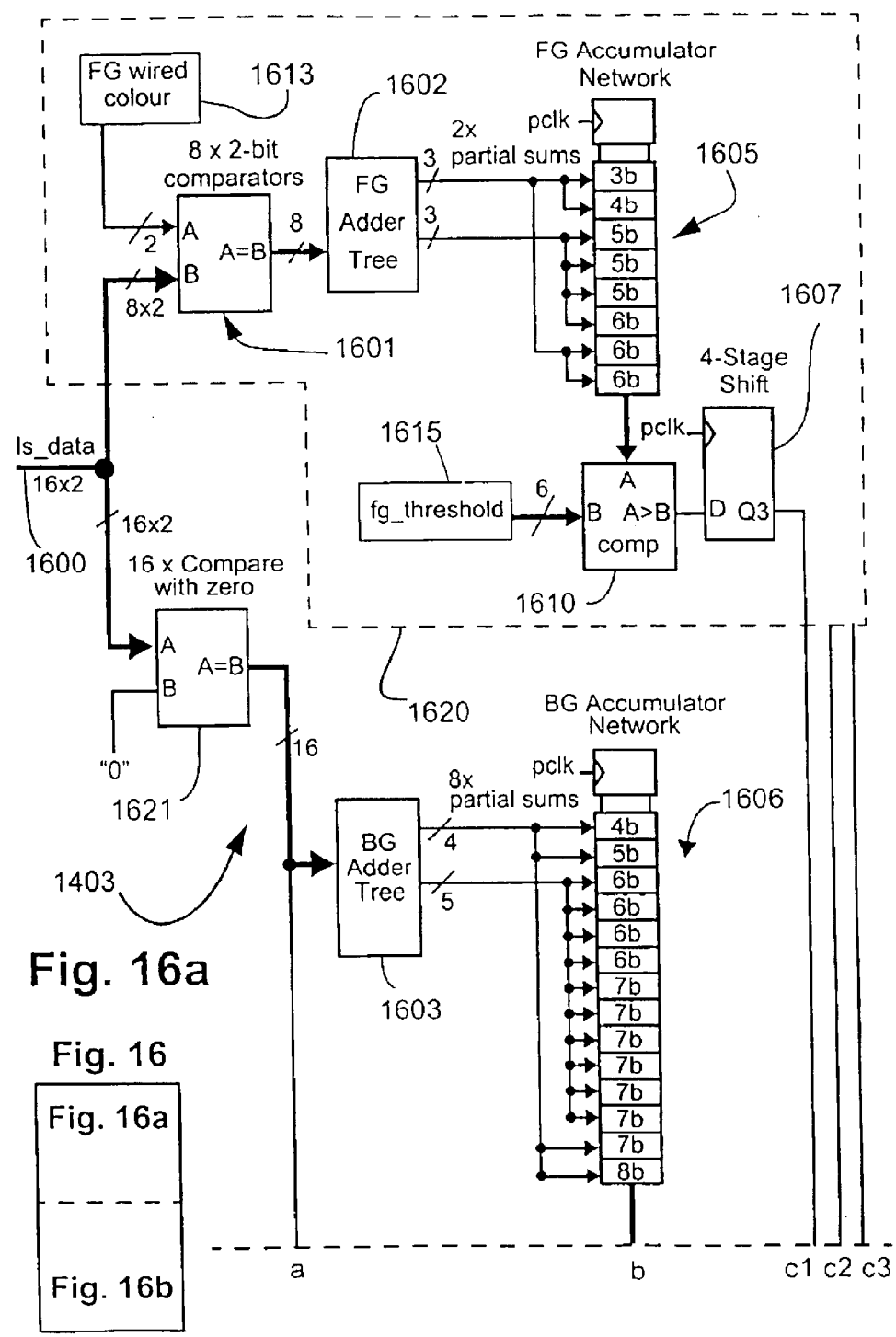
FIG. 16 is a schematic diagram of a mark element detection unit according to the preferred embodiment.
Figures 16, 16A, 16B:
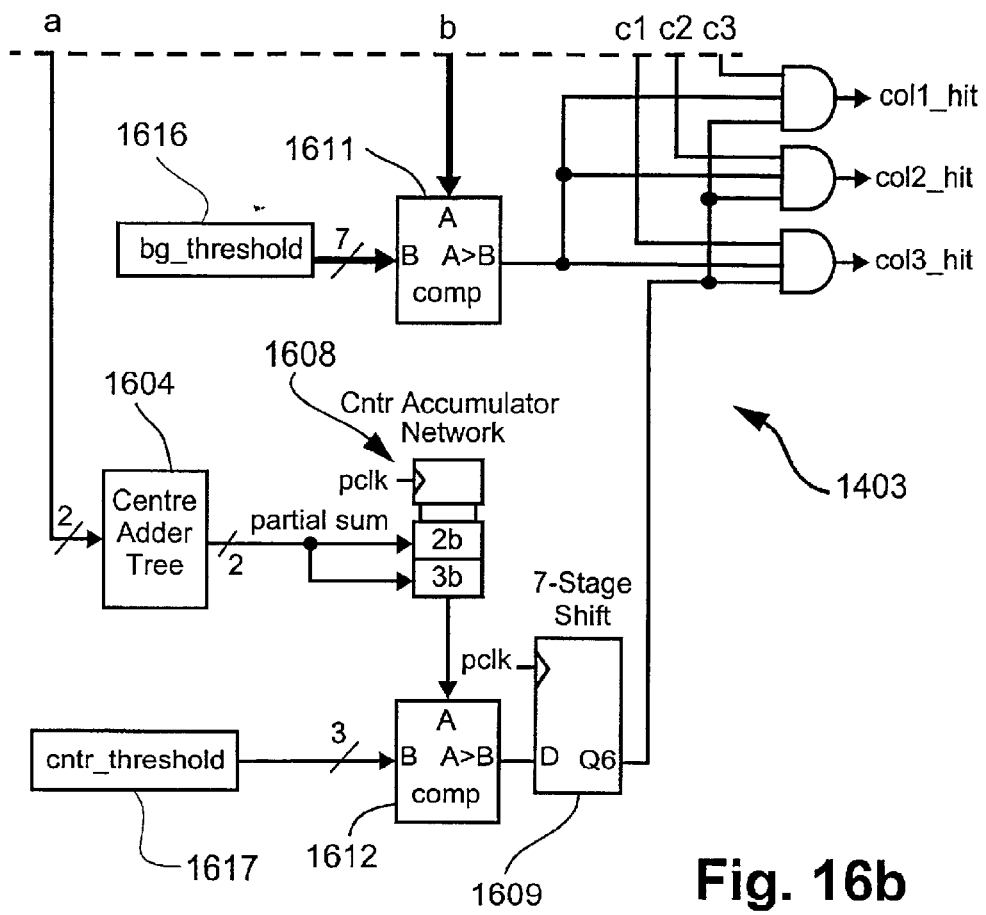

The mark element detector 1403 of FIG. 14 is illustrated in more detail in FIG. 16. FIG. 16 shows a portion 1620 of the detector 1403 for a single foreground colour (c1) determined by a foreground wired colour 1613, and a single rotational orientation. Three of the portions 1620 are required to detect mark elements having three foreground colours (shown in Table 1) and 3n times as many portion of the mark element detector for the three foreground colours and n (possible) rotational orientations of the mark elements.

A 32-bit data stream 1600 from the 16-line store 1400 is compared to the foreground colour 1613 in 8 (2-bit) equality comparators 1601. The results of the comparators 1601, and results from a further comparator 1621, which compares against zero, are passed into three different adder trees 1602, 1603 and 1604, which count the number of foreground pixels, background pixels within each of 16 vertical slices through the image. The 16 vertical slices represent the 16 columns, of cell locations, of either the element detection mask 80 or the void element mask 90. Rather than store all 16 vertical slices of a mask at once, one vertical slice at a time is processed and 16 partial sums corresponding to the 16 vertical slices are stored.

The foreground (FG) adder tree 1602 is hard-wired to look for foreground pixels in cell locations labelled 'X' of the element detection mask 80, while the background (BG) adder tree 1603 and the centre adder tree 1604 looks for background pixels in cell locations labelled 'Y' of the void element mask 90. The centre adder tree 1604 is hard-wired to look for background pixels in cell locations (labelled 'Y') at the centre of the void element mask 90, while the BG adder tree 1603 checks for peripherally located Y-labelled cells of the mask 90.

The FG adder tree 1602 produces 2 partial sums which are added into a foreground (FG) accumulator network 1605. The FG accumulator network 1605 is a shift register which stores the result of adding the incoming partial sum from the FG adder tree 1602 to a previous stage of the FG accumulator network and passes it on to a next stage. The number of bits required at each stage thus grows logarithmically to a maximum of 6 bits. For foreground pixels, only the middle 8 slices actually contribute pixels to the total, but a further 4 pipeline stages are required to line up the data with the result of a background (BG) accumulator network 1606. A result of the last stage of the FG accumulator network 1605 is compared 1610 to a foreground threshold value 1615 (fg_threshold), stored in a configuration register, to determine whether a hit is detected for the foreground pixels of this colour. The result of the comparison is then pipe-lined in a four-stage shift register 1607 to line up the result with the BG accumulator network 1606.

The BG adder tree 1603 produces 2 partial sums which are added into the BG accumulator network 1606. In a substantially similar manner to the FG accumulator network 1605, but requiring different numbers of bits at each stage, the BG accumulator network 1606 accumulates the partial sums. The number of bits required grows to a maximum of 7 bits for this accumulator and the last stage of the BG accumulator network 1606 is compared 1611 to a background threshold value (bg_threshold) 1616, stored in a configuration register, to determine whether a hit is detected for the background pixels of this colour.

The centre adder tree 1604 produces a single partial sum which is added into a centre accumulator network 1608. Again, this is similar in operation to the accumulator networks already described, excepting that it has a different number of bits at each stage, to a maximum of 3 bits. The last stage of the centre accumulator network 1608 is compared 1612 to a centre threshold value (cntr_threshold) 1617, stored in a configuration register, to determine whether a hit is detected for the centre pixels of the present colour. The result of the comparison is then pipe-lined in a seven-stage shift register 1609 to line up the result with the BG accumulator network 1606.

Finally, the result of all three comparisons are ANDed together to produce the colx_hit signal which indicates that a mark element of the present colour 1613 has been detected. Upon each mark element detection, a centre location of the detected mark element is passed to the 5-line store 1401. The centre location is derived from the fact that as a centre of mark is detected, one of the colx-hit signal will go HIGH. Thus the colx-hit signals provide a bitmap over a series of lines that identifies the centres of mark elements.

Figure 17:
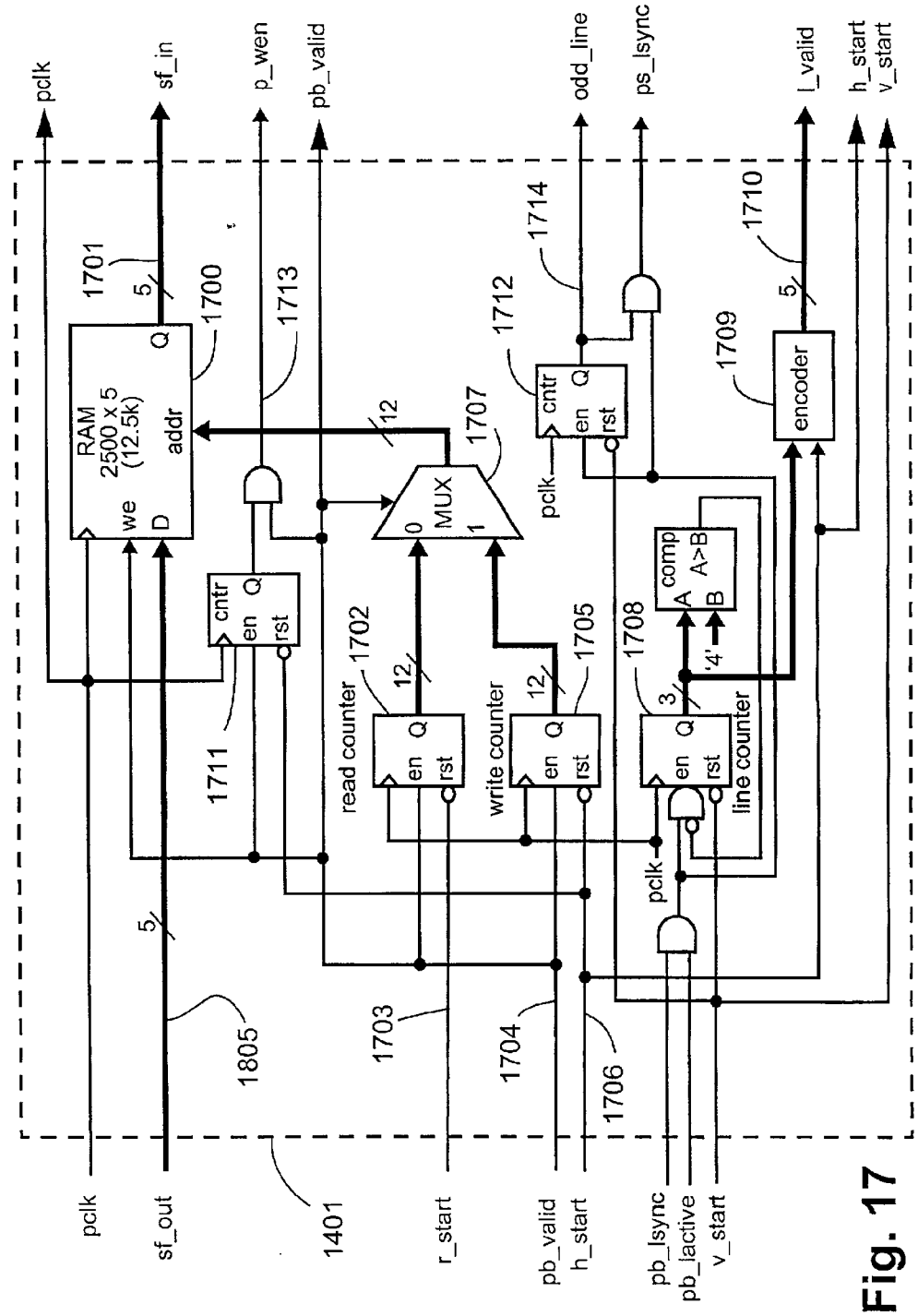
FIG. 17 is a schematic diagram of a (16-line) line store of the mark detector unit of FIG. 14.

The 5-line store 1401 is illustrated in more detail in FIG. 17 and is used to hold, temporarily, mark element centre (location) data at 200 dpi while a sharpening operation is performed on the data. The store 1401 capacity is 2500 words by 5 bits in organisation (12.5 k bits). An sf_out signal from a sharpening filter 1408 (FIG. 14) is written into a RAM array 1700, 5 clock cycles after the signal is read out of the RAM array 1700 into the sharpening filter 1408 via sf_in signal 5 bit wide data bus 1701. A write address is preferably five RAM memory addresses values below a current read address value to account for a 5-stage pipeline delay in the sharpening filter 1408. For this reason two address values are kept, one for reading and one for writing to the RAM 1700.

A read address counter 1702 is 12 bits wide and is reset by an inverted r_start 1703 signal from the 16-line store 1400 and enabled by a pb_valid 1704 signal from the pixel processor module 50.

A write address counter 1705 is also 12 bits wide and is reset by an inverted h_start 1706 and enabled by the pb_valid 1704 signal from the pixel processor module 50.

The r_start 1703 signal is asserted high 5 pixels before h_start 1706 signal is asserted high. This ensures that a read address value is always 5 greater than a write address value.

A multiplexer 1707 drives read addresses or write addresses to the RAM array 1700 according to the pb_valid 1704 signal value.

A 3-bit counter 1708 and encoder 1709 count valid lines from the start of the image and turns on the line enables 1_valid 1710 signal, one at a time as each valid line is received from the bitmap image resulting from the pixel processor module 50. At the end of the bitmap image it turns them of again. This ensures that no elements can be detected outside the image area and that the sharpening filter is correctly applied at the image boundaries.

Two one-bit counters 1711 and 1712 are used to generate a p_wen 1713 signal for the pattern store 1402 and an odd_line 1714 signal for the arrangement detector 1404. The p_wen 1713 signal is asserted on a second valid pixel in every pair of valid pixels, on every second valid line (the odd lines) of pixels.

Figure 18A:
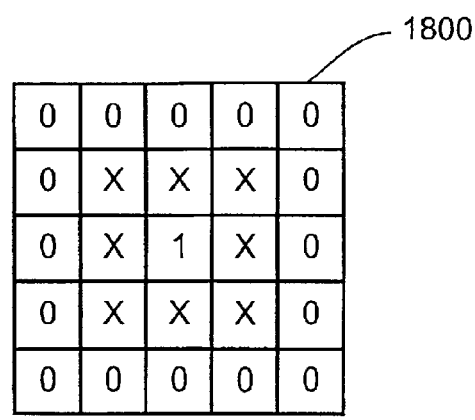
FIG. 18A is an example of a sharpening filter mask used to improve a confidence level in a mark detection.

An algorithm performed by the sharpening filter 1408 requires the application of the sharpening filter mask 1800 (or matrix). A typical mask for this purpose is shown in FIG. 18A and processes a 5×5 pixel region of a bitmap image upon each application to produce a single pixel output value. For each 5×5 area of an image, if the centre location is coincident with a bitmap pixel value of '1' and if each location labelled with a '0' in the filter mask 1800 is coincident with a bitmap pixel value of zero, then all bitmap pixels, coincident with the positions labelled 'X' on the filter mask 1800, are set to zero.

Applying this sharpening filter to the output of the mark element detector 1403, has the effect of removing any centre locations that are close to a given centre location in a small group of up to four centre locations without affecting centre location spaced by at least one non-centre pixel position. This helps reduce multiple occurrences of the same centre in the pattern store 1402.

The sharpening filter of the preferred embodiment advantageously provides a degree of flexibility in filter configurations. Each cell in the sharpening filter mask 1800 can be individually programmed to have one of four possible functions, depending on its 2-bit configuration field. A configuration value of '00' means that the cell will have no effect on the pattern match and the cell will not be cleared when a pattern match is found. A value of '01' means that the cell will be cleared when a pattern match is found. A value of '10' or '11' means that a value of '0' or '1' will contribute to the pattern match respectively (the cell must match '0' or '1' respectively for a pattern match to be found). Preferably, the sharpening filter 1408 also down-samples the data in the 5 line store 1400 to 100 dpi before the filtered data is passed on to the pattern store 1402.

Figure 18C:
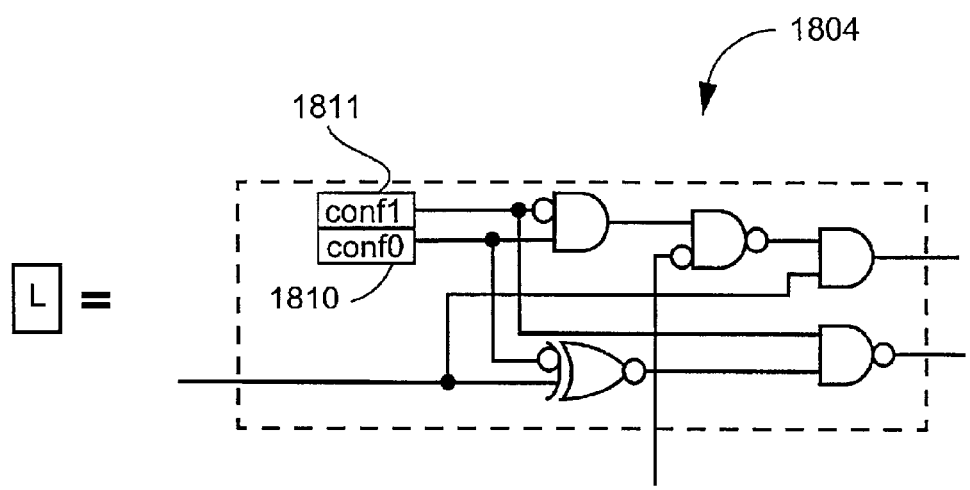
FIG. 18C is a schematic diagram of part of the sharpening filter implementation of FIG. 18B.
Figure 18B:
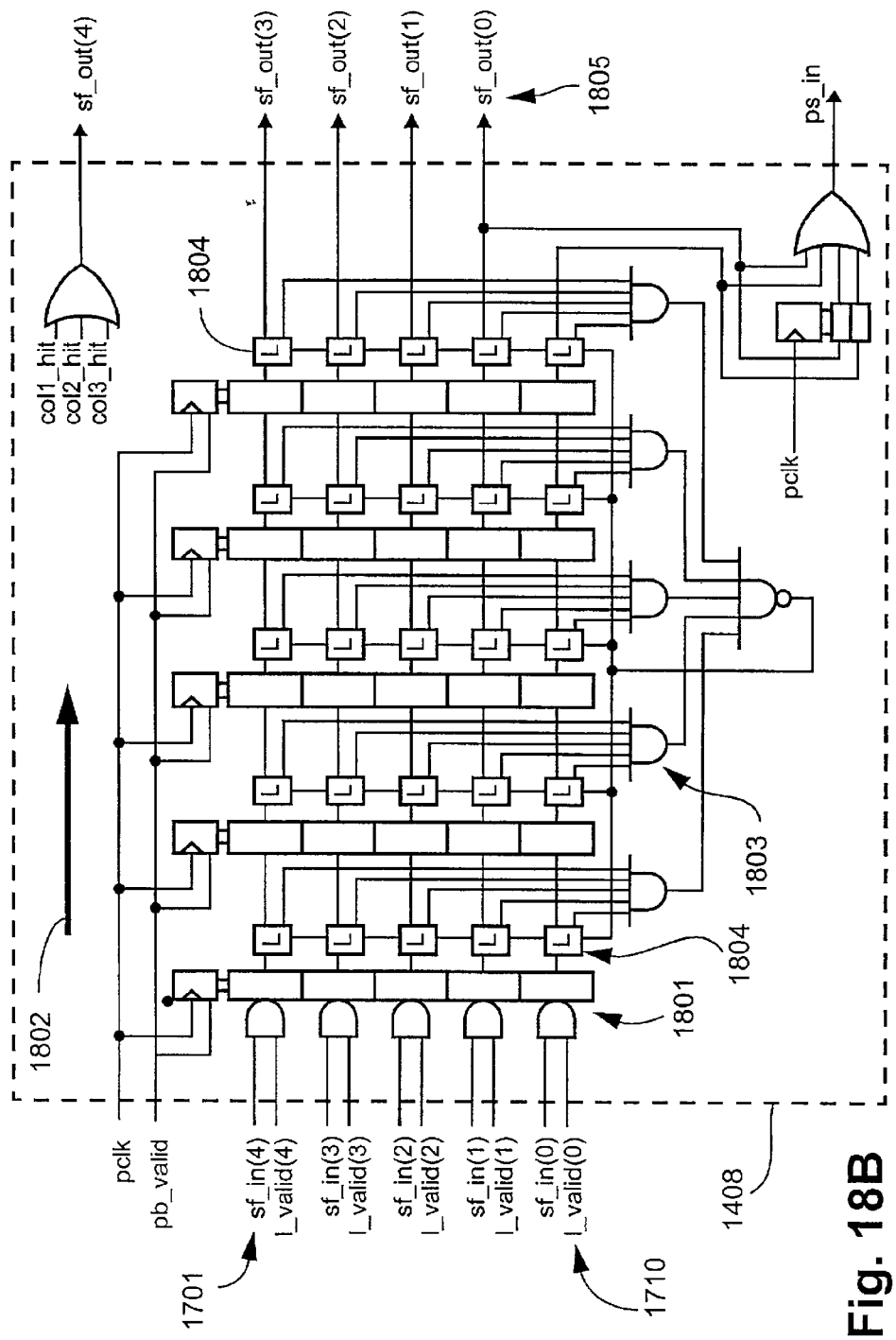
FIG. 18B is a schematic diagram of a sharpening filter implementation of the preferred embodiment of the present invention.

Referring now to FIG. 18B, there is shown a block diagram of an implementation of the sharpening filter of the preferred embodiment. A 5×5 array of flip-flops 1801 that stores 5 vertical slices through the 5 line store 1401. The flip-flop array forms a pipeline register that shifts in the direction indicated by the arrow 1802 of FIG. 18B. A plurality of gates 1803 perform a pattern matching function that causes selected flip-flops 1801 to be cleared via corresponding set of logic cells 1804 marked 'L' in FIG. 18B. These logic cells 1804 also generate detect signals used to do the pattern matching. Data read out of the final pipeline stage 1805 (ie. sf_out(0) to sf_out(4)) is written into the 5 line store 1401 while data read out of the 5 line store 1401 is loaded into the pipeline at inputs (ie. sf_in(0) to sf_in(4)) which connect to the output 1701 of the 5 line store 1401. Incoming data can be cleared to background by negation of the 1_valid 1710 signals (ie. 1_val(0) to 1_val(4)) from the 5 Line Store 1401.

Colour hit signals 1401 from the element detector 1403 are ORed together as seen in FIG. 18B to be written into the 5 line store 1401. If any of the three colour hits is asserted, then an element centre has been detected and is stored in the 5 line store 1401 as a '1' on the first line (bit 4).

The data from the 5 line store 1401 is thus continuously shifted in the direction of the arrow 1802 shown and top to bottom of the sharpening filter 1408 of FIG. 18B with the incoming data stream so that it behaves like a 5 line window into the original image.

As seen in FIG. 18B, the bottom two pixels out of the end of the pipeline are ORed with 1 cycle delayed versions of the same to generate a ps_in signal. This is the maximum down-sampled (100 dpi) data which is subsequently stored in the pattern store 1402.

Referring now to FIG. 18C, there is shown in more detail the configuration of the logic cells (L) 1804 of FIG. 18B. Two configurable register values conf0 1810 and conf1 1811 are used to configure the sharpening filter 1408 and represent a first bit and a second bit signal of the configuration value as previously described. A configuration value of '00' represents conf0=0 and conf1=0.

Figure 19:
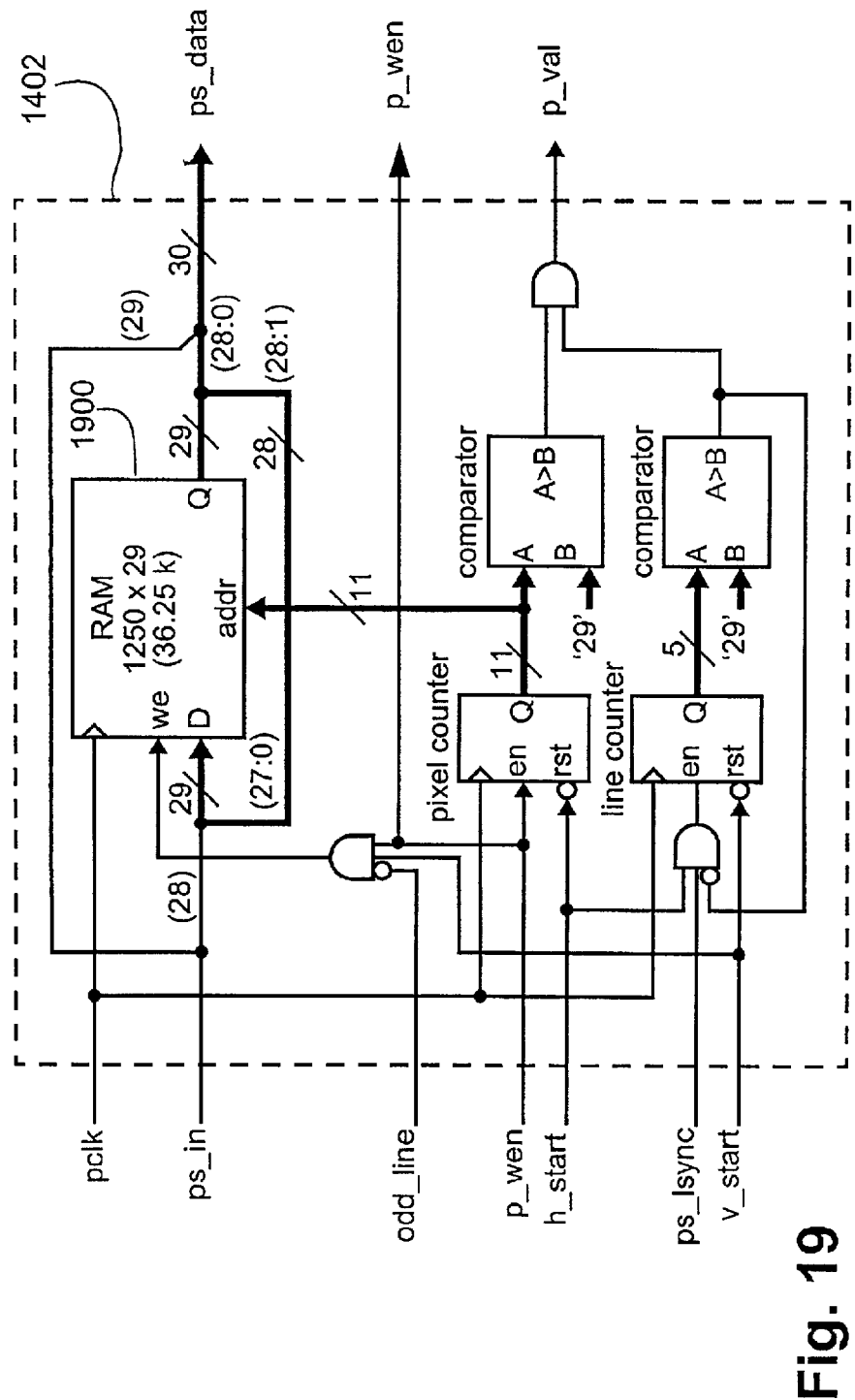
FIG. 19 is a schematic diagram of a pattern store shown in the mark detector unit of FIG. 14, in more detail.

The pattern store 1402 shown in FIG. 14 is illustrated in more detail in FIG. 19 and is substantially similar, in operation, to the 16-line store 1400, excepting only 1250 words of, RAM memory 1900, are needed because of the reduced resolution. Preferably, the pattern store 1402 stores 30 lines of data to enable an efficient application of the masks of FIG. 10 and FIG. 11 by the arrangement detector 1404.

Figure 20:
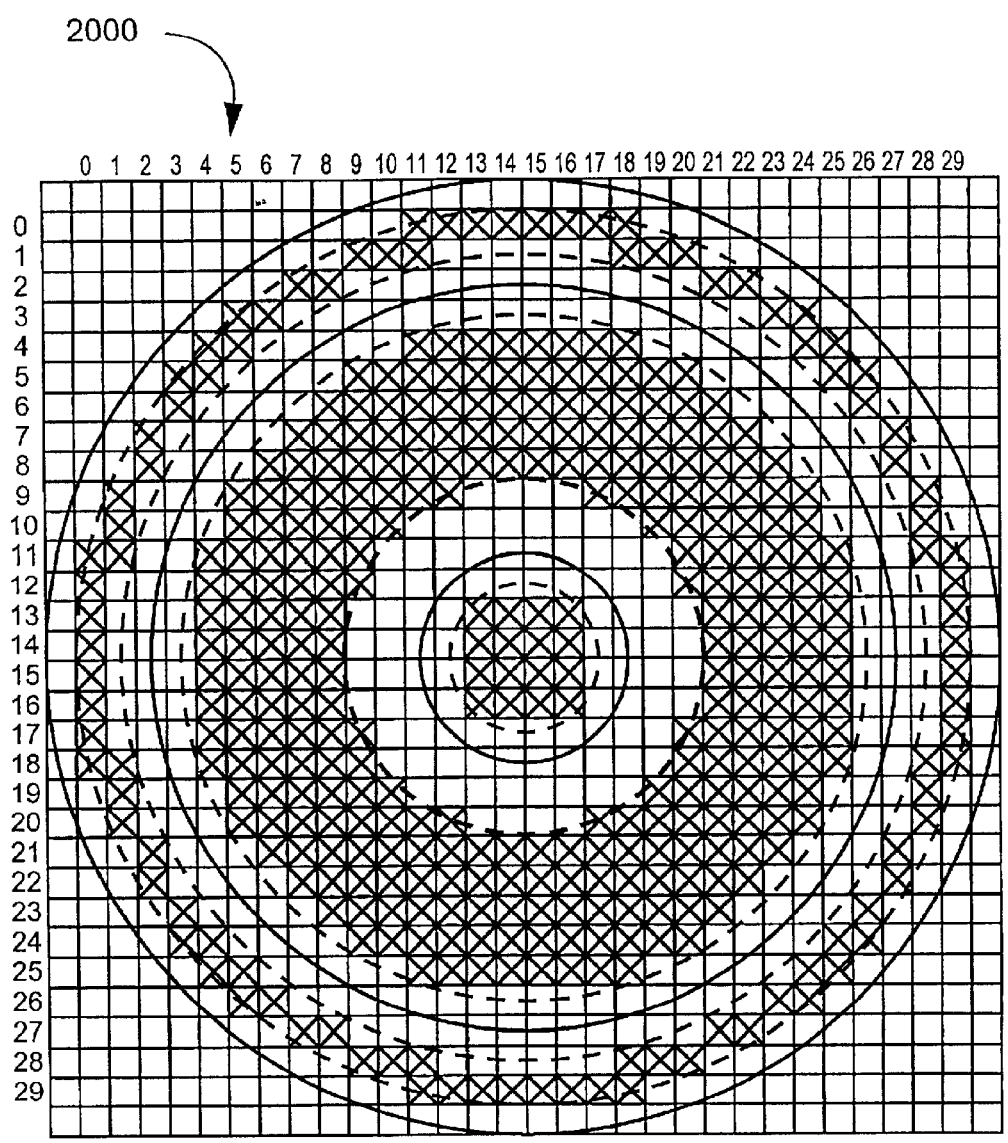
FIG. 20 is a zero detect mask in accordance with the preferred embodiment.

Referring to FIG. 20 there is shown a zero detect mask 2000 which, when overlaid upon the content of the pattern store 1402, is used to detect whether or not a mark element centre location in coincident with an X-labelled cell of the mask 2000. The zero detect mask 2000 has a substantially similar function on a mark as the void element mask 90 has on a mark element, and is used on the content of the pattern store 1402 to trigger the signature generator of the arrangement detector 1404. The zero detect mask is applied by the background (BG) detector 1405 and if a false results, that is, there is a mark element centre location coincident with an X-labelled cell of the mask 2000, then the mask 2000 is moved to another pixel in the pattern store and re-applied. Otherwise, a true is returned by the BG detector 1405, that is, there are no mark element centre location where there should not be, the signature detector is triggered to determined a signature for a current content of the pattern store where the mask 2000 is applied.

Figure 21:
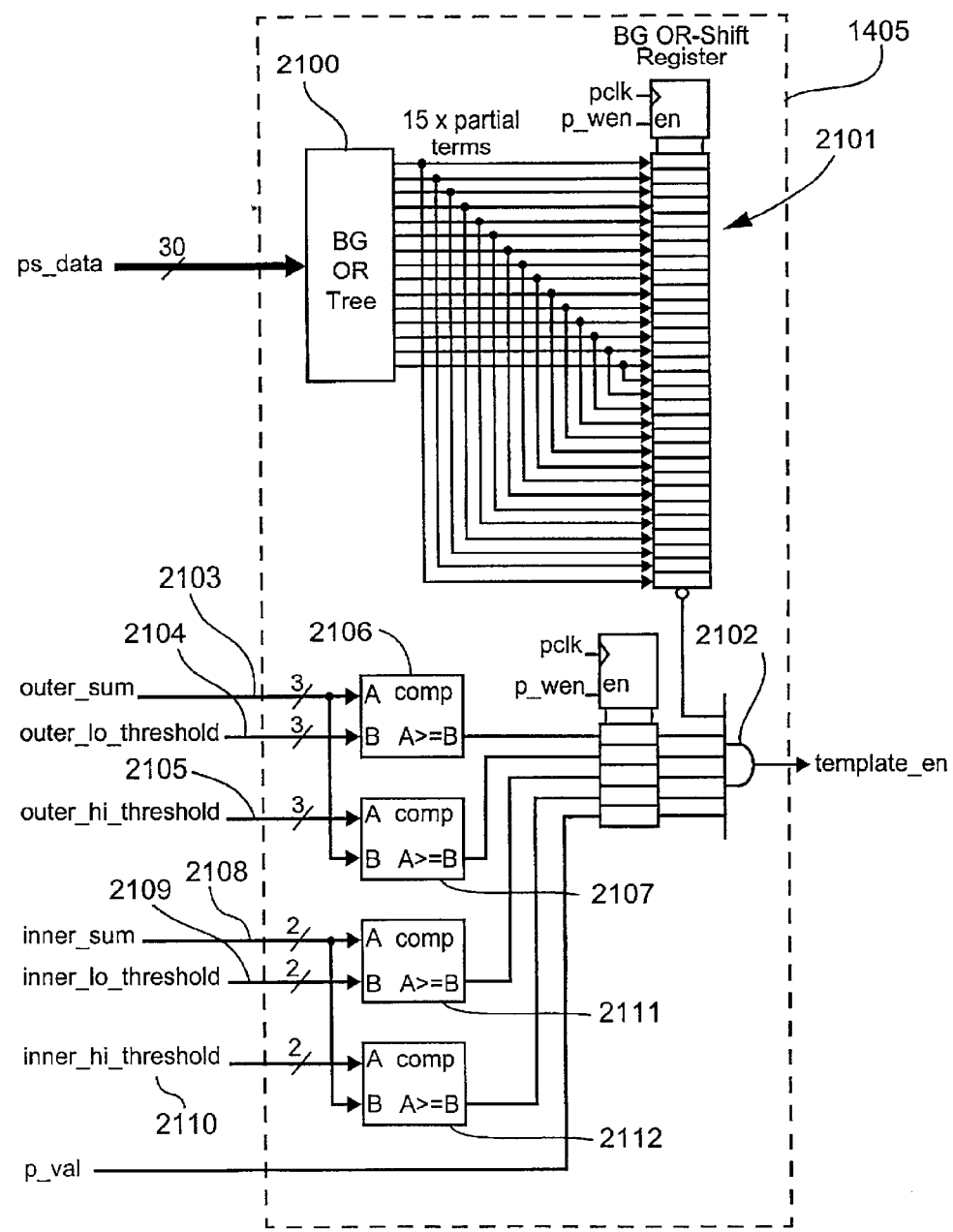
FIG. 21 is a schematic diagram of the background detector shown in FIG. 14, in more detail.

The background detector 1405 of FIG. 14. is illustrated in detail in FIG. 21. Data (ps_data) from the pattern store 1402 enters a background OR-Tree 2100 where vertical slices through the pattern store 1402 are ORed together to produce the 15 partial terms. Only 15 are needed because the zero detect mask 2000 has reflective symmetry about a vertical slice through the middle of the mask 2000. As such, the 15 partial terms are repeated in reverse order to make up 30 terms input to a background (BG) OR-shift register 2101, in which each of the 30 terms is ORed with the output of a previous stage of the BG OR-shift register 2101 and stored back into a current stage of the register 2101. A single bit stream data output from the BG OR-shift register 2101 represents an OR result of all pixels coincident with the X-labels of the zero detect mask 2000. If any bit is asserted (indicating the presence of an element) then a template_en 2102 signal is de-asserted, indicating that a valid mark cannot be flagged at this location.

The background detector 1405 also determines whether or not there are a correct number of mark element centre locations to determine an outer ring signature and an inner ring signature in accordance with the signature detect mask 1000 of FIGS. 10 and 11. To this end, an outer_sum 2103 data signal is compared to the values in the outer_lo_threshold 2104 signal and outer_hi_threshold 2105 signal registers in a pair of 3-bit comparators 2106 and 2107. If both comparisons are true, then the required number of mark element centre locations have been detected for determining a correct outer ring signature. A corresponding comparison is performed for an inner_sum 2108 signal using values in a inner_lo_threshold 2109 and an inner_hi_threshold 2110 registers in a pair of 2-bit comparators 2111 and 2112. If both comparisons are true, then the required number of mark element centre locations have been detected for determining a correct inner ring signature. If both pairs of comparisons determined above are true, and the shift register 2101 output is false, then a valid mark detect is possible at this position and the template_en 2102 signal is asserted.

Figures 22, 22A:
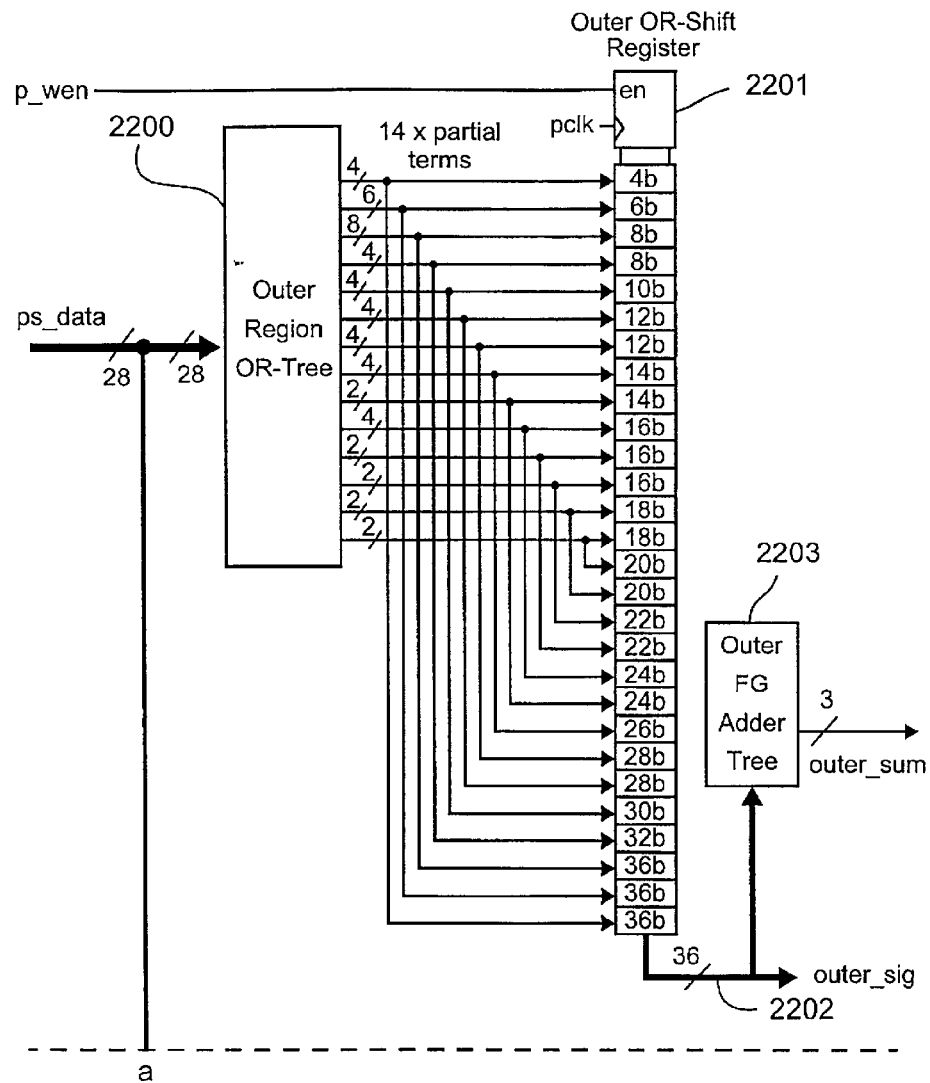
FIG. 22 is a schematic diagram of the signature generator shown in FIG. 14, in more detail.
Figures 22, 22A, 22B:
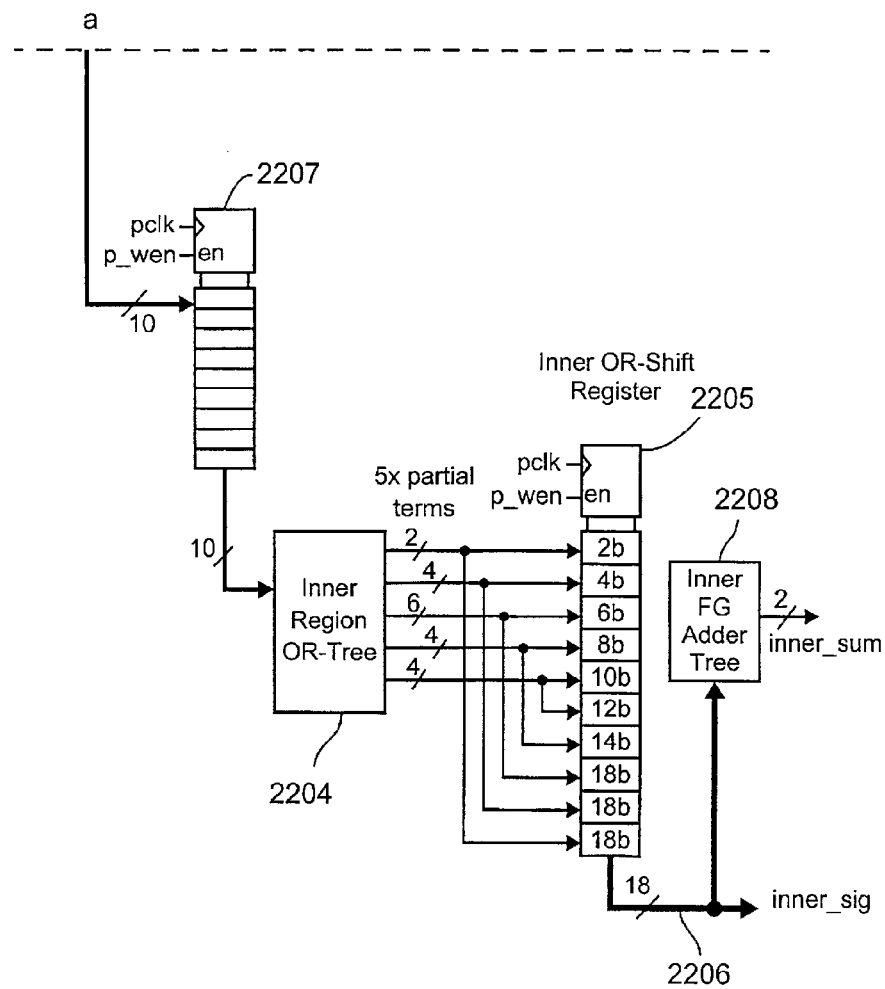

The signature generator 1406 of FIG. 14 is shown in greater detail in FIG. 22 and is used to determine an outer and inner ring signature in accordance with the signature detect mask 1000 shown in FIGS. 10 and 11. The content of the pattern store 1402 is passed through the outer region OR-tree 2200 which is hardwired to look at the shaded cell locations in the signature detect mask 1000 of FIG. 10. The outer region OR-tree 2200 takes vertical slices through the pattern store and OR's bits found coincident at the shaded cell locations of the signature detect mask 1000 of FIG. 10 using an outer OR-shift register 2201. An output 2202 of the outer OR-shift register 2201 is a 36-bit value representing an outer ring signature for a mark at a current data position in the pattern store 1402. The output 2202 is also directed through an outer FG adder tree 2203 to determine the number of mark elements detected for the outer ring signature. In a substantially similar manner, a 18-bit inner ring signature 2206 is generated by an inner region OR-tree 2204 and an inner OR-shift register 2205 from the content of the pattern store 1402 in accordance with the signature detect mask 1007 of FIG. 11. However the data from the pattern store 1402 is first pushed through a 9 stage pipeline 2207 to align the data in accordance with the relative positions of signature detect mask 1007 and signature detect mask 1000 of FIGS. 11 and 10 respectively. An inner FG adder tree 2208 is used to determine the number mark elements detected for the inner ring signature.

Figure 23A:
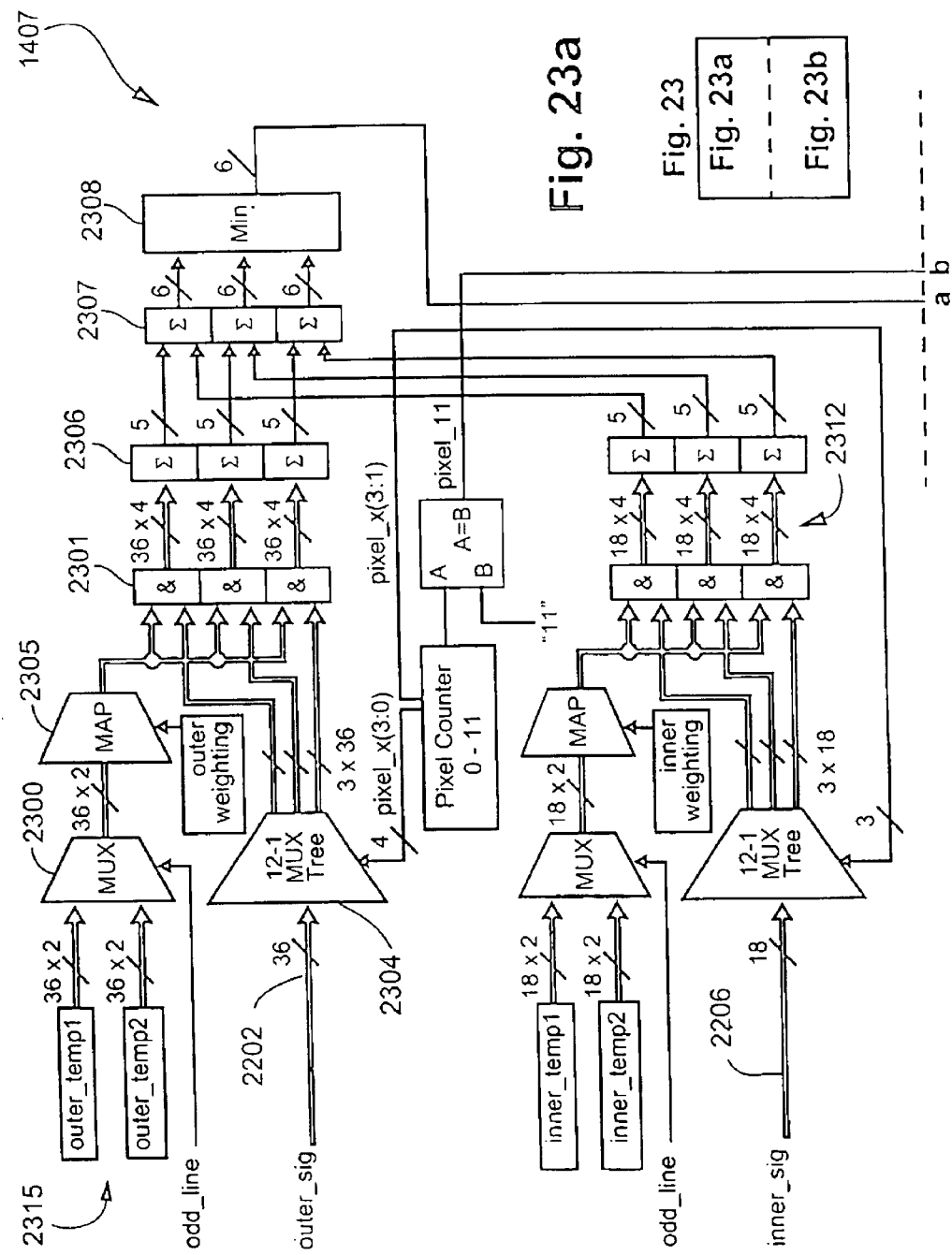
FIG. 23 is a schematic diagram of the signature correlator shown in FIG. 14, in more detail.

FIG. 23 is a detailed block diagram of the signature correlator 1407 of FIG. 14. The signature correlator 1407 performs a correlation between signatures generated by the signature generator 1406 and predetermined or known signatures for each of the marks represented in FIG. 3 and FIG. 4. In addition, the signature correlator 1407 determines a correlation error for each of 36 possible rotations of the signature.

A known outer ring signature for one of the two marks shown in FIG. 3 or FIG. 4 is selected by a multiplexer 2300 according to whether a current line is active or active plus one. The selected signature passed to a set of three identical AND networks 2301 that gate the known outer ring signature values with an output of a 12-1 multiplexer (MUX) tree 2304. The 12-1 MUX tree 2304 selects three outer signatures according to which hclk signal clock period is current relative to an incoming outer signature signal 2202 (from the signature generator FIG. 22). Before being input to the AND networks 2301, the known outer ring signature values, derived from configurable registers 2315, are first passed through a MAP function 2305 that maps values from the known outer ring signature to real weighting values as defined in template weighting registers. The outputs from the AND networks 2301 are passed to a set of three identical adder trees 2306 which produce a sum corresponding to a correlation error between the known outer ring signature and the incoming outer signature signal 2202. A substantially similar circuit arrangement 2312 produces correlation error values between a known inner ring signature for the two marks of FIG. 3 or FIG. 4 and an incoming inner signature signal 2206 (also shown in FIG. 22). The inner correlation values from the circuit 2312 are added in adders 2307 to the outer correlation error values derived from the adders 2306 to make a total correlation errors for each signature. The total correlation error values are provided to a first minimum block unit 2308 which passes on a smallest of three input values to a pipeline register 2309 that is used to hold the total correlation error values.

The total correlation values are compared, by a second minimum block unit 2310, to each other to determine a lowest value, which is passed on to a compatibility calculator 1409 (FIG. 14) via a correlation error bus 2311 (corr_err signal). The lowest total correlation value is used to determine a confidence level or 'goodness of fit' of a match to one or other of the marks shown in FIG. 3 and FIG. 4.

Figure 24:
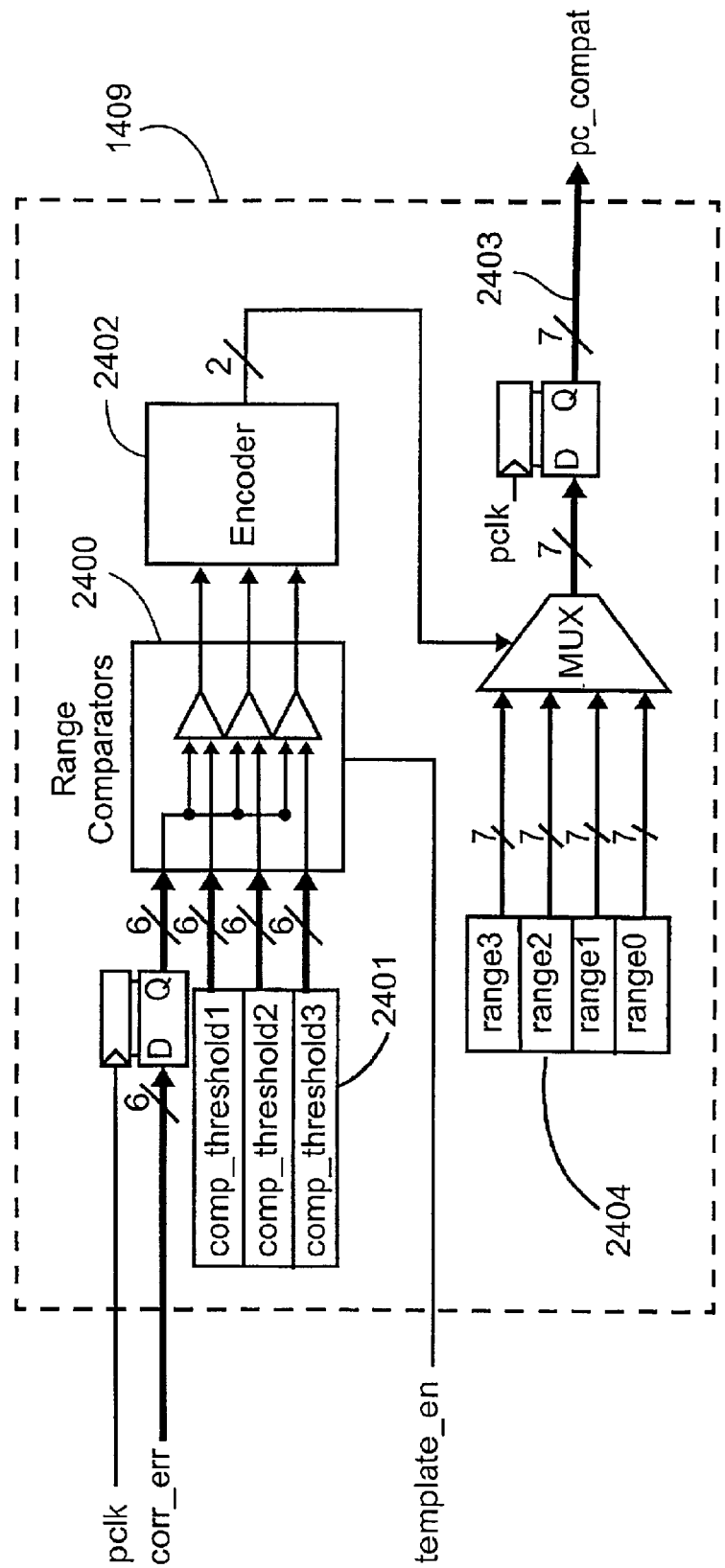
FIG. 24 is a schematic diagram of the compatibility calculator shown in FIG. 14, in more detail.

FIG. 24 shows the compatibility calculator 1409 in FIG. 14 in greater detail. The compatibility calculator 1409 comprises a set of range comparators 2400 that compare an incoming corr_err value (ie. lowest total correlation value output from the signature correlator 1407) to each of a plurality of predetermined thresholds 2401, derived from configurable registers. The output of the range comparators 2400 is a set of 3 range detects that immediately pass into an encoder 2402 which encodes the range detect input into a 2-bit value corresponding to an input corr_err value range that was determined. This 2-bit range value selects one of four possible range values 2404, also derived from configurable registers, to pass to the evidence combiner module 1302, via a pc_compat bus 2403.

The lowest total correlation value is thus split into four regions according to programmable thresholds values, which are then assigned to one of four fixed values in compatibility space. The four pre-defined fixed values are programmed via a plurality of range values 2404 and which preferably have a value set between 0 and 100.

The evidence combiner module 1302 takes the value of compatibility and enables or disables functions of an input device, output device or a combined input/output device such as a photocopier in accordance with a thresholding criteria on the compatibility value. For example, the functions may include the prevention of copying, the sounding of a warning or the shutting down of the device in which the preferred embodiment is installed.

Figure 25:
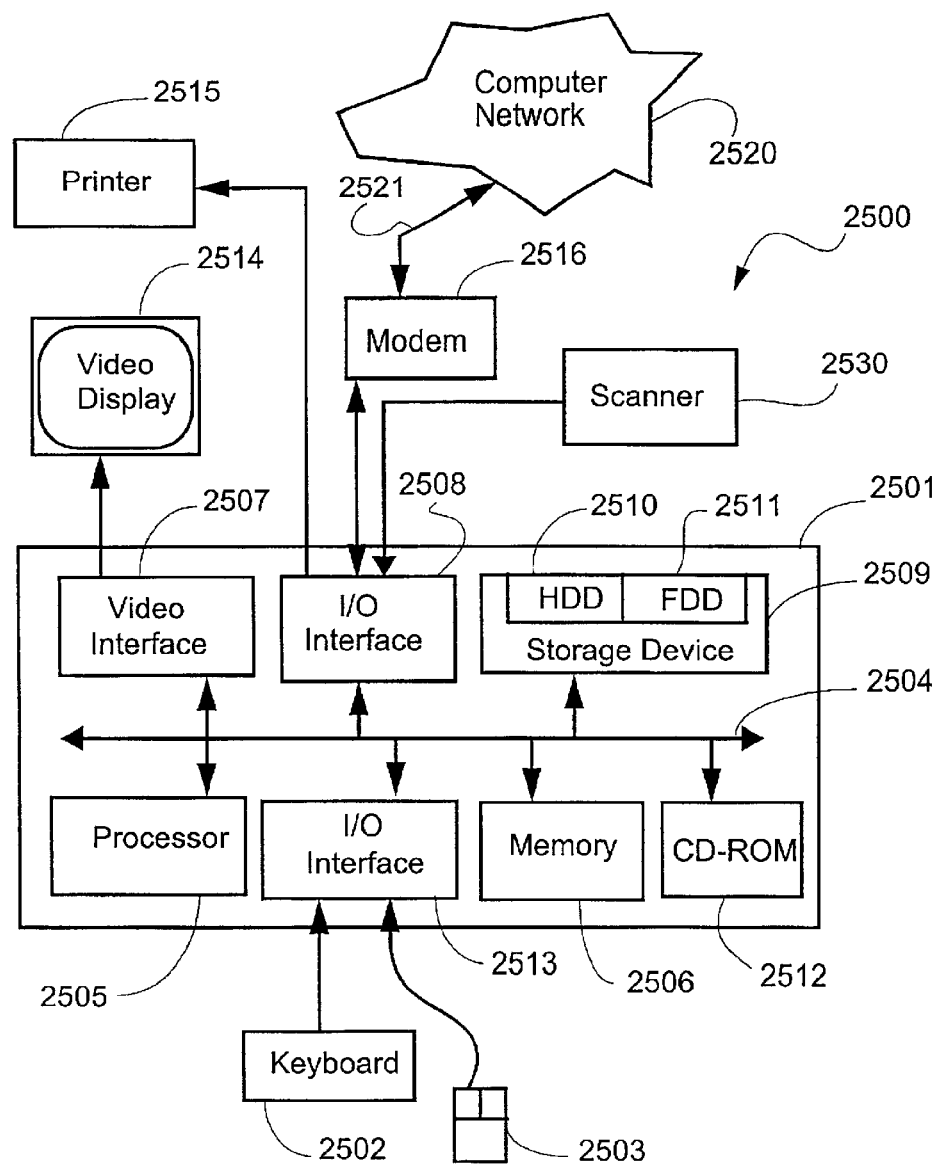
FIG. 25 is a schematic block diagram representation of a computer system in which an embodiment of the present invention may be practiced.

The above described processing may alternatively be performed using a conventional general-purpose computer system 2500, such as that shown in FIG. 25 wherein the mark detection, pattern matching and associated processes of FIGS. 2 to 24 may be implemented as software, such as an application program executing within the computer system 2500. In particular, the processing steps are effected by instructions in the software that are carried out by the computer. The software may be divided into two separate parts; one part for carrying out the actual processes described above and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus in accordance with an embodiment of the invention.

The computer system 2500 comprises a computer module 2501, input devices such as a keyboard 2502 and mouse 2503, output devices including a printer 2515 and a display device 2514. A Modulator-Demodulator (Modem) transceiver device 2516 is used by the computer module 2501 for communicating to and from a communications network 2520, for example connectable via a telephone line 2521 or other functional medium. The modem 2516 can be used to obtain access to the Internet, and other network systems, such as a Local Area Network (LAN) or a Wide Area Network (WAN).

The computer module 2501 typically includes at least one processor unit 2505, a memory unit 2506, for example formed from semiconductor random access memory (RAM) and read only memory (ROM), input/output (I/O) interfaces including a video interface 2507, and an I/O interface 2513 for the keyboard 2502 and mouse 2503 and optionally a joystick (not illustrated), and an interface 2508 for the modem 2516. A storage device 2509 is provided and typically includes a hard disk drive 2510 and a floppy disk drive 2511. A magnetic tape drive (not illustrated) may also be used. A CD-ROM drive 2512 is typically provided as a non-volatile source of data. The components 2505 to 2513 of the computer module 2501, typically communicate via an interconnected bus 2504 and in a manner which results in a conventional mode of operation of the computer system 2500 known to those in the relevant art. Examples of computers on which the embodiments can be practised include IBM-PC's and compatibles, Sun Sparcstations or alike computer systems evolved therefrom.

Typically, the application program is resident on the hard disk drive 2510 and read and controlled in its execution by the processor 2505. Intermediate storage of the program and any data fetched from the network 2520 may be accomplished using the semiconductor memory 2506, possibly in concert with the hard disk drive 2510. In some instances, the application program may be supplied to the user encoded on a CD-ROM or floppy disk and read via the corresponding drive 2512 or 2511, or alternatively may be read by the user from the network 2520 via the modem device 2516. Still further, the software can also be loaded into the computer system 2500 from other computer readable medium including magnetic tape, a ROM or integrated circuit, a magneto-optical disk, a radio or infra-red transmission channel between the computer module 2501 and another device, a computer readable card such as a PCMCIA card, and the Internet and Intranets including email transmissions and information recorded on websites and the like. The foregoing is merely exemplary of relevant computer readable media. Other computer readable media may be practiced without departing from the scope and spirit of the invention.

A scanner 2530 is shown coupled to the computer module 2501 to provide pixel data to the memory unit 2506 for storage and processing using the application program executed by the processor 2505. Alternatively input pixel data may be supplied from the network 2520. The user interface may be presented for interactive manipulation by the user via the display 2514. Reproduction, of the image where desired, and authorised by the pattern matching process, may be performed by printing on the printer 2515.

INDUSTRIAL APPLICABILITY

It is apparent from the above that the embodiment(s) of the invention are applicable to the protecting documents such as bank notes and instruments from fraudulent copying and the like. The system also enable verification of authenticity of documents.

The foregoing describes only some embodiments of the present invention, and modifications and/or changes can be made thereto without departing from the scope and spirit of the invention, the embodiment(s) being illustrative and not restrictive.

What is claimed is:

1. A method of detecting a predetermined mark embedded in an image, said mark comprising a predetermined arrangement of a plurality of elements, said elements having a predetermined colour characteristic, the method comprising the steps of:

processing the image to provide an encoded representation of the image at a predetermined resolution, said encoded representation being adapted to emphasize the elements of the mark based on the predetermined color characteristics of the elements;

detecting a location of each of said elements of the mark embedded in the image from the encoded representation;

applying a mask having a predefined annular region to said mark to convert those detected element locations that fall within said annular region into a set of spatial features representing an angular distribution of the detected elements of said mark;

comparing the converted set of spatial features to a known set of spatial features to provide a confidence level measure representing a correlation error between the spatial features of the known set and the determined set of spatial features; and detecting said predetermined mark on the basis of said confidence level measure.

2. The method of claim 1, wherein the features indicating said angular distribution comprise a signature indicating a discrete angular distribution about a predetermined origin for each mark.

3. A method according to claim 1, wherein said image data comprises a plurality of pixels, each said pixel being represented using multiple colour channels, the method comprising the steps of;

inputting pixels in a predetermined order and detecting transitions between foreground and background pixels;

subsampling in a first direction of the image data in accordance with an intensity of one said colour channel of the image data to provide a first desired resolution in said first direction;

examining said one colour channel and outputting:
a) if an intensity value of said one colour channel is below a first predetermined threshold value, a first token;
b) if the intensity value of said one colour channel is above a second predetermined threshold value, a second token; or
c) if the intensity value is intermediate the first and second threshold values;
ca) the first token when a transition is detected upon inputting said pixels; and
cb) the second token when a transition is not detected upon inputting said pixels;

encoding each said pixel by selectively grouping each said pixel represented in at least one other of said colour channels into one group of a plurality foreground colour groups if said examining step outputs a first token and grouping into a background colour group if said examining step outputs a second token, and outputting for each pixel a representation of the corresponding group; and subsampling in a second direction of the image data to achieve a second desired resolution in said second direction.

4. A method according to claim 3, wherein said transition is determined using lead pixels and lag pixels.

5. A method according to claim 4, wherein said foreground pixel is a pixel having colour value belonging to a predetermined set colour values and the background pixel is a pixel which is not a foreground pixel.

6. A method according to claim 5, wherein said predetermined order is raster scan order.

7. A method according to claim 6, wherein said transition is a transition from background pixel to foreground pixel.

8. A method according to claim 6, wherein said transition is a transition from a foreground pixel to a background pixel.

9. A method according to claim 1, wherein said image comprises a plurality of pixels, each said pixel being encoded either as foreground or background pixel, said predetermined pattern substantially matching a predetermined reference pattern, the reference pattern being representable by a mask arranged as a two dimensional array of cells, each cell having indicated thereon whether the cell is a foreground pixel, background pixel or neither, the method comprising the steps of:

providing a plurality of one dimensional arrays of pixel values of said image, wherein each array is provided sequence;

generating a plurality of partial sums of foreground pixels for a current one dimensional array of pixel values which match with foreground cells of the reference pattern of a slice of the mask;

generating a plurality of partial sums of background pixels for the current one dimensional array of pixel values which match with background cells of the reference pattern of said slice of the mask;

accumulating the partial sums of foreground pixels for a predetermined number of input one dimensional arrays of pixel values to provide a total foreground count value;

accumulating the partial sums of background pixels for a predetermined number of input one dimensional arrays of pixel values to provide a total background count value;

thresholding the total foreground count value and the total background count value against a first and second predetermined threshold value respectively and outputting a value reflecting each threshold comparison; and determining from each output value whether or not the predetermined pattern is detected.

10. A method according to claim 9, wherein said foreground pixels are pixels having one colour selected from a first set of colour values and said background pixels are pixels having one colour selected from a second predetermined set of colour values.

11. A method according to claim 10, wherein each cell of the slice of the mask corresponds with a pixel value of the one dimensional array.

12. A method according to claim 1, wherein said image comprises a plurality of pixels, each said pixel being either on or off, said predetermined pattern substantially matching a predetermined reference pattern, the reference pattern being representable by a mask arranged as a two dimensional array of cells, each cell having indicated thereon whether the cell is on or off, the method comprising the steps of:

providing a plurality of one dimensional arrays of pixel values of said image, wherein each array is provided sequence;

generating a plurality of partial sums of on pixel values for a current one dimensional array of pixel values which match with an on cell of the reference pattern of a slice of the mask;

accumulating the partial sums for a predetermined number of input one dimensional arrays of pixel values; and thresholding the accumulated partial sums against a predetermined threshold value and determining whether or not the predetermined pattern is detected based on the threshold comparison.

13. A method according to claim 1 wherein said encoded representation is at a reduced resolution when compared to the image.

14. A method according to claim 1 wherein said mask is a signature mask and said method further comprises applying a zero detect mask to said mark to detect whether or not a mark element center location is coincident with one of a group of cells of the zero detect mask associated with said annular region.

15. A method according to claim 14 wherein said signature mask and said zero detect mask are unitarily formed.

16. A method according to claim 14 wherein said group of cells complements said annular region.

17. Apparatus for detecting a predetermined mark embedded in an image, said mark comprising a predetermined arrangement of a plurality of elements, said elements having a predetermined colour characteristic, the apparatus comprising:

processing means for processing the image to provide an encoded representation of the image at a predetermined resolution, said encoded representation being adapted to emphasize the elements of the mark based on the predetermined color characteristics of the elements;

detecting means for detecting a location of each of said elements of the mark embedded in the image from the encoded representation;

conversion means for applying a mask having a predefined annular region to said mark to convert those detected element locations that fall within said annular region into a set of spatial features representing a an angular distribution of the detected elements of said mark;

comparison means for comparing the converted set of spatial features to a known set of spatial features so as to provide a confidence level measure, and outputting the confidence level measure representing a correlation error between the spatial features of the known set and the determined set of spatial features; and mark detection means for detecting said predetermined mark on the basis of said confidence level measure.

18. Apparatus according to claim 17, wherein the features indicating said angular distribution comprise a signature indicating a discrete angular distribution about a predetermined origin for each mark.

19. Apparatus according to claim 18, wherein the signature comprises a plurality of radial signatures, each said radial signature indicating a discrete angular distribution of each element in a predetermined annular region encircling said origin.

20. Apparatus according to claim 18, wherein said comparison means compares a signature of the determined spatial feature with a corresponding signature of a known mark.

21. Apparatus according to claim 17, wherein said image data comprising a plurality of pixels, each said pixel being represented using multiple colour channels, said apparatus comprising:

pixel buffer pipe means, having an input means for receiving said image data in a predetermined order and for detecting transitions between foreground and background pixels;

a pixel selection means for subsampling said image data in a first direction in accordance with an intensity of one said colour channel of the image data to provide a first desired resolution in said first direction;

foreground density checking means for receiving said one colour channel and outputting;

a) if an intensity value of one said colour channel is below a first predetermined threshold value, a first token;

b) if the intensity value of said one colour channel is above a second predetermined threshold value, a second token; or c) if the intensity value of said one colour channel is intermediate the first and second threshold values:

ca) the first token when a transition is detected at the pixel buffer pipe means; and cb) the second token when a transition is not detected at the pixel buffer pipe means;

encoding means for receiving at least one other of said colour channels and selectively grouping each pixel represented in said at least one other colour channel into one group of a plurality foreground colour groups if the output of said foreground density checking means is the first token and grouping into a background colour group if the output of said foreground density checking means is the second token, said encoding means outputting for each pixel a representation of the corresponding group; and output buffer means for receiving said representation and providing a subsampling in a second direction of the image data to achieve a second desired resolution in said second direction.

22. Apparatus according to claim 21, wherein further comprising subsample control means for further subsampling in said second direction according to a magnification value and an input resolution value.

23. Apparatus according to claim 22, wherein said transition is determined by the pixel buffer pipe means using lead pixels and lag pixels.

24. Apparatus according to claim 23, wherein said predetermined order comprises a raster scan order.

25. Apparatus according to claim 24, wherein said transition is a transition from background pixel to foreground pixel.

26. Apparatus according claim 25, wherein said first and second desired resolutions are substantially the same resolution.

27. Apparatus according to claim 17, wherein said image comprising a plurality of pixels, each said pixel being encoded either as a foreground or background pixel, said predetermined pattern being intended to substantially match a predetermined reference pattern, the reference pattern being represented by a mask arranged as a two dimensional array of cells, the cells having indicated thereon whether the reference pattern comprises foreground pixels, background pixels or neither, said apparatus comprising:

input means for receiving a plurality of one dimensional arrays of pixel values of said image, wherein each said array being received sequentially;

foreground adder means for generating a plurality of partial sums of said foreground pixels, for each array of pixel values, intended to match with the reference pattern of the mask, wherein each partial sum of said foreground pixels substantially corresponds to an application of a slice of said mask;

background adder means for generating a plurality of partial sums of said background pixels, for each array of pixel values, intended to match with the reference pattern of the mask, wherein each partial sum of said background pixels substantially corresponds to the application to the application of said slice;

a foreground accumulator network for providing a total foreground count value of said plurality of partial sums for a predetermined number of input arrays of pixel values;

a background accumulator network for providing a total background count value of said plurality of partial sums for the predetermined number of input arrays of pixel values;

thresholding means for thresholding the total foreground count value and the total background count value against first and second predetermined threshold values respectively and outputting a value reflecting each threshold comparison; and determining means for determining from each output value whether or not the predetermined pattern is detected.

28. Apparatus according to claim 27, wherein said image comprises a plurality of scan lines, each said scan line having a plurality of pixel values and said one dimensional array comprises a predetermined number of pixel values of corresponding locations on a plurality of adjacent scan lines.

29. Apparatus according to claim 27, wherein said apparatus forms a pipeline circuit for pipelining the sequences of one dimensional arrays.

30. Apparatus according to claim 17 wherein said encoded representation is at a reduced resolution when compared to the image.

31. Apparatus according to claim 17 wherein said mask is a signature mask and said apparatus further comprises means for applying a zero detect mask to said mark to detect whether or not a mark element center location is coincident with one of a group of cells of the zero detect mask associated with said annular region.

32. A computer program product including a computer readable medium having recorded thereon a computer program for detecting a predetermined mark embedded in an image, said mark comprising a predetermined arrangement of a plurality of elements, said elements having a predetermined colour characteristic, the computer program product comprising:

processing means for processing the image to provide an encoded representation of the image at a predetermined resolution, said encoded representation being adapted to emphasize the elements of the mark based on the predetermined color characteristics of the elements;

detecting means for detecting a location of each of said elements of the mark embedded in the image from the encoded representation;

conversion means for applying a mask having a predefined annular region to said mark to convert those detected element locations that fall within said annular region into a set of spatial features representing a an annular distribution of the detected elements of said mark;

comparison means for comparing the determined set of spatial features and a known set of spatial features so as to provide a confidence level measure, and outputting the confidence level measure representing a correlation error between the spatial features of the known set and the determined set of spatial features; and mark detection means for detecting the predetermined mark on the basis of said confidence level measure.

33. A computer program product according to claim 32, wherein the features indicating said angular distribution comprises a signature indicating a discrete angular distribution about a predetermined origin for each mark.

34. A computer program product according to claim 33, wherein the signature comprises a plurality of radial signatures, each said radial signature indicating a discrete angular distribution of each element in a predetermined annular region encircling said origin.

35. A computer program product according to claim 33, wherein said comparison means compares a signature of the determined spatial feature with a corresponding signature of a known mark.

36. A computer program product according to claim 32, wherein said image data comprises a plurality of pixels, each pixel being represented using multiple colour channels, the computer program product comprising:

pixel buffer pipe means, having an input means for receiving said image data in a predetermined order and for detecting transitions between foreground and background pixels;

pixel selection means for subsampling said image data in a first direction in accordance with an intensity of one said colour channel of the image data to provide a first desired resolution in said first direction;

foreground density examining means for receiving said one colour channel and outputting:

a) if an intensity value of said one colour channel is below a first predetermined threshold value, a first token;

b) if the intensity value of said one colour channel is above a second predetermined threshold value, a second token; or c) if the intensity value of said one colour channel is intermediate the first and second threshold values;

ca) the first token when a transition is detected at the pixel buffer pipe means; and cb) the second token when a transition is not detected at the pixel buffer pipe means;

encoding means for receiving at least one other of said colour channels and selectively grouping each pixel represented in said at least one other colour channel into one group of a plurality foreground colour groups if the output of said foreground density examining means is a first token and grouping into a background colour group if the output of said foreground density checking means is a second token, said encoding means outputting for each pixel a representation of the corresponding group; and output buffer means for receiving said representation and providing a subsampling in a second direction of the image data to achieve a second desired resolution in said second direction.

37. A computer program product according to claim 36, wherein said transition is determined by the pixel buffer pipe means using lead pixels and lag pixels.

38. A computer program product according to claim 37, wherein said first and second desired resolutions are substantially the same resolution.

39. A computer program product according to claim 32, wherein said image comprises a plurality of pixels, each said pixel being encoded either as a foreground or background pixel, said predetermined pattern substantially matching a predetermined reference pattern, the reference patten being represented by a mask arranged as two dimensional array of cells, the cells having indicated thereon whether the reference patten is foreground pixel, background pixel or neither, the computer program product comprising:

input means for receiving a plurality of one dimensional arrays of pixel values of said image, wherein each array is received sequentially;

foreground adder means for generating a plurality of partial sums of foreground pixels, for each array of pixel values, which match with the reference pattern of the mask, wherein each partial sum substantially corresponds to an application of a slice of said mask;

background adder means for generating a plurality of partial sums of background pixels, for each array of pixel values, which match with the reference pattern of the mask, wherein each partial sum of background pixels substantially corresponds to the application of said slice;

a foreground accumulator network for providing a total foreground count value of said plurality of partial sums for a predetermined number of input arrays of pixel values;

a background accumulator network for providing a total background count value of said plurality of partial sums for the predetermined number of input arrays of pixel values;

thresholding means for thresholding the total foreground count value and the total background count value against a first and second predetermined threshold value respectively and outputting a value reflecting each threshold comparison; and determining means for determining from each output value whether or not the predetermined pattern is detected.

40. A computer program product according to claim 39, wherein said image comprise a plurality of scan lines, each scan line having a plurality of pixel values and said one dimensional array comprises a predetermined number of pixel values of corresponding locations on a plurality of adjacent scan lines.

41. A computer program product according to claim 40, wherein said foreground pixels are pixels having one colour selected from a first set of colour values and said background pixels are pixels having one colour selected from a second predetermined set of colour values.

42. A computer program product according to claim 32 wherein said encoded representation is at a reduced resolution when compared to the image.

43. A computer program product according to claim 32 wherein said mask is a signature mask and said computer program product further comprises means for applying a zero detect mask to said mark to detect whether or not a mark element center location is coincident with one of a group of cells of the zero detect mask associated with said annular region.

44. Apparatus for detecting a predetermined mark embedded in an image, said mark comprising a predetermined arrangement of a plurality of elements, each element having a predetermined colour characteristic and predetermined shape, the apparatus comprising:

processing means for processing the image to provide an encoded representation of the image at a predetermined resolution;

detecting means for detecting coordinate positions of substantially each of said elements of the mark embedded in the image, wherein the detection is characterised by applying at least one mask to substantially each pixel of the encoded representation;

spatial feature determining means for determining a plurality of radial signatures, each said radial signature indicating a discrete angular distribution of each element in about a predetermined origin;

comparison means for comparing the determined set of spatial features to a known set of spatial features and outputting a confidence level measure representing a correlation error between the spatial features of the known set and the determined set of spatial features; and mark detecting means for detecting said predetermined mark on the basis of said confidence level measure.

45. A computer program product including a computer readable medium having recorded thereon a computer program for detecting a predetermined mark embedded in an image, said mark comprising a predetermined arrangement of a plurality of elements, each element having a predetermined colour characteristic and predetermined shape, the computer program product comprising:

processing means for processing the image to provide an encoded representation of the image at a predetermined resolution;

detecting means for detecting coordinate positions of substantially each of said elements of the mark embedded in the image, wherein the detection is characterised by applying at least one mask to substantially each pixel of the encoded representation;

spatial feature determining means for determining a plurality of radial signatures, each said radial signature indicating a discrete angular distribution of each element in about a predetermined origin;

comparison means for comparing the determined set of spatial features to a known set of spatial features and outputting a confidence level measure representing a correlation error between the spatial features of the known set and the determined set of spatial features; and mark detection means for detecting said predetermined mark on the basis of said confidence level.

* * * * *

UNITED STATES PATENT AND TRADEMARK OFFICE
CERTIFICATE OF CORRECTION

PATENT NO. : 6,952,484 B1
APPLICATION NO. : 09/441294
DATED : October 4, 2005
INVENTOR(S) : Paul Raymond Higginbottom et al.

It is certified that error appears in the above-identified patent and that said Letters Patent is hereby corrected as shown below:

<u>Title page,</u>
Item [57], ABSTRACT,
Line 16, "are" should read -- is --.

<u>Column 1,</u>
Line 20, "(e.g." should read -- (e.g., --, and "bonds etc)" should read -- bonds, etc.) --.

<u>Column 2,</u>
Line 13, "FIG. 3 an" should read -- FIG. 3 is an --.
Line 15, "FIG. 4 another" should read -- FIG. 4 is another --.
Line 21, "use" should read -- used --.

<u>Column 3,</u>
Line 62, "(eg." should read -- (e.g., --.

<u>Column 7,</u>
Line 27, "colour the" should read -- colour of the --.

<u>Column 9,</u>
Line 12, "a priori," should be italicized.

<u>Column 10,</u>
Line 61, "form" should read -- from --.

<u>Column 11,</u>
Lines 59 and 61, "is" should read -- are --.

<u>Column 12,</u>
Line 34, "desirable" should read -- disable --.
Line 55, "is" should read -- are --.

<u>Column 14,</u>
Line 66, "same" should read -- sake --.

<u>Column 16,</u>
Line 1, "portion" should read -- portions --.
Line 20, "looks" should read -- look --.

UNITED STATES PATENT AND TRADEMARK OFFICE
CERTIFICATE OF CORRECTION

PATENT NO. : 6,952,484 B1
APPLICATION NO. : 09/441294
DATED : October 4, 2005
INVENTOR(S) : Paul Raymond Higginbottom et al.

It is certified that error appears in the above-identified patent and that said Letters Patent is hereby corrected as shown below:

Column 17,
Line 37, "turns" should read -- turn --.
Line 41, "of" should read -- off --.

Column 18,
Line 33, "Line Store" should read -- line store --.
Line 59, "of," should read -- of --.

Column 19,
Line 11, "location" should read -- locations --.
Line 13, "mined" should read -- mine --.
Line 45, "a" should read -- an --.

Column 20,
Line 2, "a" (second occurrence) should read -- an --.
Line 24, "passed" should read -- passes --.

Column 22,
Line 31, "Reproduction," should read -- Reproduction --.
Line 39, "enable" should read -- enables --.
Line 55, "color" should read -- colour --.

Column 23,
Line 12, "of;" should read -- of: --.
Line 27, "values;" should read -- values: --.
Line 34, "plurality fore-" should read -- plurality of fore- --.
Line 48, "set colour" should read -- set of colour --.

Column 24
Lines 53 and 56, "claim 1" should read -- claim 1, --.
Lines 62 and 64, "claim 14" should read -- claim 14, --.

Column 25,
Line 8, "color" should read -- colour --.
Line 15, "a" (second occurrence) should be deleted.
Line 40, "comprising" should read -- comprises --.
Line 53, "outputting;" should read -- outputting: --.

UNITED STATES PATENT AND TRADEMARK OFFICE
CERTIFICATE OF CORRECTION

PATENT NO. : 6,952,484 B1
APPLICATION NO. : 09/441294
DATED : October 4, 2005
INVENTOR(S) : Paul Raymond Higginbottom et al.

It is certified that error appears in the above-identified patent and that said Letters Patent is hereby corrected as shown below:

Column 26,
Line 2, "plurality foreground" should read -- plurality of foreground --.
Line 28, "comprising" should read -- comprises --.
Line 50, "to the application" should be deleted.

Column 27,
Lines 8 and 11, "claim 17" should read -- claim 17, --.
Line 28, "color" should read -- colour --.
Line 35, "a" (second occurrence) should be deleted.
Line 36, "annular" should read -- angular --.
Line 49, "comprises" should read -- comprise --.

Column 28,
Line 12, "values;" should read -- values: --.
Line 20, "plurality foreground" should read -- plurality of foreground --.
Lines 40 and 43, "patten" should read -- pattern --.

Column 29,
Line 10, "comprise" should read -- comprises --.
Lines 20 and 23, "claim 32" should read -- claim 32, --.

Signed and Sealed this

Twenty-seventh Day of June, 2006

JON W. DUDAS
*Director of the United States Patent and Trademark Office*